US008994981B2

(12) United States Patent
Yamada

(10) Patent No.: US 8,994,981 B2
(45) Date of Patent: Mar. 31, 2015

(54) CALIBRATION SYSTEM

(75) Inventor: Ryuji Yamada, Ogaki (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 811 days.

(21) Appl. No.: 12/324,321

(22) Filed: Nov. 26, 2008

(65) Prior Publication Data

US 2009/0141306 A1 Jun. 4, 2009

(30) Foreign Application Priority Data

Nov. 30, 2007 (JP) ................................ 2007-310337

(51) Int. Cl.
*G06F 3/12* (2006.01)
*B41J 29/393* (2006.01)

(52) U.S. Cl.
CPC .................................... *B41J 29/393* (2013.01)
USPC ........................... 358/1.15; 358/1.9; 358/504

(58) Field of Classification Search
CPC .. G06F 3/1229; G06F 3/1288; H04N 1/00344
USPC ......................................... 358/504, 1.9, 1.15
See application file for complete search history.

(56) References Cited

U.S. PATENT DOCUMENTS

2002/0140974 A1 10/2002 Imaizumi
2003/0090688 A1 5/2003 Kimura
2005/0063749 A1* 3/2005 Harris et al. .................... 400/62
2006/0092452 A1* 5/2006 Simpson ...................... 358/1.14
2006/0215192 A1* 9/2006 Nagahara et al. ............. 358/1.9

FOREIGN PATENT DOCUMENTS

| | | |
|---|---|---|
| JP | 6-281477 | 10/1994 |
| JP | 11-289454 | 10/1999 |
| JP | 2002-297354 | 10/2002 |
| JP | 2005-119011 | 5/2005 |
| JP | 2005-122232 | 5/2005 |
| JP | 2006-268213 | 10/2006 |

* cited by examiner

*Primary Examiner* — Marivelisse Santiago Cordero
*Assistant Examiner* — Kent Yip
(74) *Attorney, Agent, or Firm* — Scully, Scott, Murphy & Presser, P.C.

(57) ABSTRACT

A calibration system includes a plurality of printers, a grouping unit, a printer-selecting unit, a corrections data acquiring unit, a group determining unit, and a print-data creating unit. A set of condition data is set for each printer. The grouping unit allocates each printer into either one of at least one group, based on the set of condition data for each printer. The printer-selecting unit selects, for each group, a printer among at least one printer belonging to the each group. The correction data acquiring unit acquires, for each group, one set of correction data created by the selected printer. The group determining unit determines one group, to which one of the printers that is desired to perform printing belongs. The print-data creating unit creates a set of print data based on the set of correction data corresponding to the determined group.

9 Claims, 18 Drawing Sheets

FIG.2

| ITEM | VALUE |
| --- | --- |
| AVERAGE TEMPERATURE IN PAST ONE WEEK | 28.2 |
| AVERAGE HUMIDITY IN PAST ONE WEEK | 50.4 |

FIG.3

| ITEM | VALUE |
| --- | --- |
| NUMBER OF CYAN-TONER COPIES | 1010 |
| NUMBER OF MAGENTA-TONER COPIES | 1205 |
| NUMBER OF YELLOW-TONER COPIES | 100 |
| NUMBER OF BLACK-TONER COPIES | 130 |

FIG.4

| ITEM | VERSION |
| --- | --- |
| TONER VERSION | 1.00 |
| PHOTOSENSITIVE-BODY VERSION | 1.01 |
| FIXING-DEVICE VERSION | 1.00 |

| INPUT DENSITY | CORRECTED INPUT DENSITY |
|---|---|
| 0 | 0 |
| 1 | 1 |
| 2 | 2 |
| 3 | 3 |
| ⋮ | |
| 39 | 58 |
| 40 | 60 |
| 41 | 61 |
| ⋮ | |
| 98 | 97 |
| 99 | 99 |
| 100 | 100 |

FIG.10

| CALIBRATION RESULT DATA | |
|---|---|
| CREATING-TIME DATE | DENSITY-CORRECTING DATA |
| 20070904 20:01 | (LOOKUP TABLES) |

| PRINTER NAME | TEMPERATURE | HUMIDITY |
|---|---|---|
| PRINTER A | 24.6 | 54.6 |
| PRINTER B | 29.0 | 50.2 |
| .... | .... | .... |

FIG.15

| PRINTER NUMBER | PRINTER INFORMATION | | ENVIRON-MENT ID | ENVIRONMENT PRINTER NUMBER |
|---|---|---|---|---|
| | PRINTER NAME | INSTALLATION DATE | | |
| 1 | PRINTER A | 20070901 | A | 1 |
| 2 | PRINTER B | 20070905 | A | 2 |
| 3 | PRINTER C | 20071011 | B | 1 |
| 4 | PRINTER D | 20071012 | B | 2 |
| 5 | PRINTER E | 20070901 | B | 3 |
| 6 | PRINTER F | 20071030 | A | 3 |

FIG.18

| ENVIRON-MENT ID | PRINTER NAME | CALIBRATION RESULT DATA | | ENVIRONMENT PRINTER NUMBER |
|---|---|---|---|---|
| | | CREATING-TIME DATA | DENSITY-CORRECTING DATA | |
| A | PRINTER A | 20070904 21:05 | (LOOKUP TABLES) | 1 |
| B | PRINTER D | 20070831 10:35 | (LOOKUP TABLES) | 2 |

CALIBRATION SYSTEM

CROSS REFERENCE TO RELATED APPLICATION

This application claims priority from Japanese Patent Application No. 2007-310337 filed Nov. 30, 2007. The entire content of this priority application is incorporated herein by reference.

TECHNICAL FIELD

The present invention relates to a calibration system for correcting density at high efficiency.

BACKGROUND

Various methods of performing a calibrating process have been proposed in order to correct density of an image formed by a printing apparatus such as a printer various calibrating processes for use in printers connected to a network have been proposed.

The calibrating process for correcting the density accompanies the consumption of toner and waste of time. Therefore, in a system having a plurality of printers connected to the network, it is preferable to acquire calibrating data from a specific printer, and use the acquired calibrating data for other printers. For example, Unexamined Japanese Patent Application Publication No. 2005-119011 describes a system in which calibrating data acquired from a specific printer is transmitted to another printer designated by a user.

In the system disclosed in Unexamined Japanese Patent Application Publication No. 2005-119011 the user needs to designate the printer from which the calibrating data should be acquired. The designation of the printer is troublesome for the user.

SUMMARY

In view of the foregoing, it is an object of the present invention to provide an improved calibration system which can increase the efficiency regarding the calibrating process.

In order to attain the above and other objects, the invention provides a calibration system including a plurality of printers, a grouping unit, a printer-selecting unit, a correction data acquiring unit, a group determining unit, and a print-data creating unit. A set of condition data is set for each printer. The grouping unit allocates each printer into either one of at least one group, based on the set of condition data for each printer. The printer-selecting unit selects, for each group, a printer among at least one printer belonging to the each group. The correction data acquiring unit acquires, for each group, one set of correction data created by the selected printer. The group determining unit determines one group, to which one of the printers that is desired to perform printing belongs. The print-data creating unit creates a set of print data based on the set of correction data corresponding to the determined group.

According to another aspect, the present invention provides a computer connectable to a plurality of printers, a set of condition data being set for each printer. The computer includes a grouping unit, a printer-selecting unit, a correction data acquiring unit, a group determining unit, and a print-data creating unit. The grouping unit allocates each printer into either one of at least one group, based on the set of condition data for each printer. The printer-selecting unit selects, for each group, a printer among at least one printer belonging to the each group. The correction data acquiring unit acquires, for each group, one set of correction data from the selected printer. The group determining unit determines one group, to which one of the printers that is desired to perform printing belongs. The print-data creating unit creates a set of print data based on the set of correction data corresponding to the determined group.

According to another aspect, the present invention provides a method executed by a computer connectable to a plurality of printers, a set of condition data being set for each printer. The method includes: allocating each printer into either one of at least one group, based on the set of condition data for each printer; selecting, for each group, a printer among at least one printer belonging to the each group; acquiring, for each group, one set of correction data from the selected printer; determining one group, to which one of the printers that is desired to perform printing belongs; and creating a set of print data based on the set of correction data corresponding to the determined group.

According to another aspect, the present invention provides a computer readable recording medium storing a set of program instructions executable on a computer connectable to a plurality of printers, a set of condition data being set for each printer. The program instructions includes: allocating each printer into either one of at least one group, based on the set of condition data for each printer; selecting, for each group, a printer among at least one printer belonging to the each group; acquiring, for each group, one set of correction data from the selected printer; determining one group, to which one of the printers that is desired to perform printing belongs; and creating a set of print data based on the set of correction data corresponding to the determined group.

BRIEF DESCRIPTION OF THE DRAWINGS

The particular features and advantages of the invention as well as other objects will become apparent from the following description taken in connection with the accompanying drawings, in which:

FIG. 2 is a diagram showing an example of the configuration of environment data;

FIG. 3 shows an example of the configuration of toner-using-state data;

FIG. 4 shows an example of the configuration of mechanism-characteristic data;

FIG. 10 is a diagram showing an example of the data configuration of calibration result data;

FIG. 15 is a diagram illustrating an example of the data configuration of printer list;

FIG. 18 is a diagram showing an example of the data configuration of calibration result data list;

DETAILED DESCRIPTION

Figure 1:
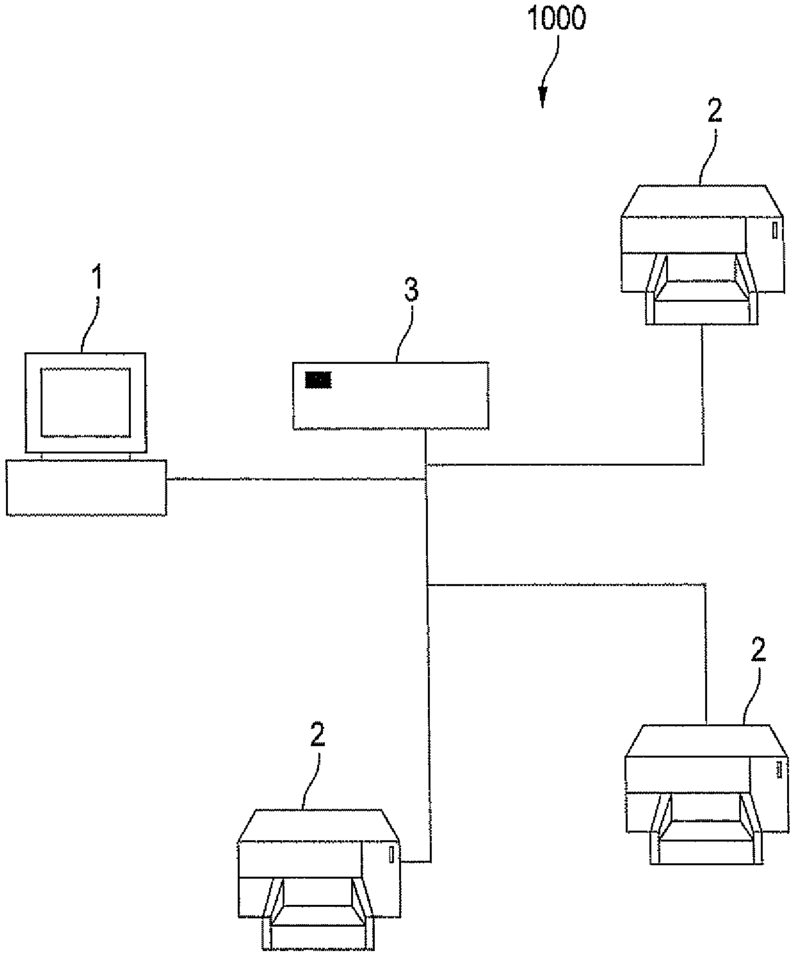
FIG. 1 is a diagram showing an example of the configuration of a calibration system according to an embodiment of the present invention, the calibration system including a computer and a plurality of printers.

A calibration system according to an embodiment of this invention will be described. FIG. 1 is a diagram showing an example of the configuration of the calibration system. As shown in FIG. 1, the calibration system 1000 according to the embodiment includes a computer 1, a plurality of printers 2, and a relay apparatus 3.

The relay apparatus 3 connects the printers 2 to the computer 1. The computer 1 and each printer 2 function to exchange (transmit and receive) various data with each other. The method for exchanging the various sets of data between the computer 1 and each printer 2 will be described later. The computer 1 functions to execute various programs (will be described later). Specifically, the computer 1 includes a processor or CPU (not shown) that executes various programs and a computer-storing unit (also not shown) that is prestored with the various programs and is for storing various data. The various programs include: a program for a basic process shown in FIG. 11; a program for a printer list creating process shown in FIG. 13; a program for a calibration result data list updating process shown in FIG. 17; and a program for a printing process shown in FIG. 20, all of which will be described later. The various data includes: printer-grouping data shown in FIG. 14; a printer list shown in FIG. 15; a calibration result data list shown in FIG. 18.

Each printer 2 includes a CPU (not shown) executing programs in response to an instruction received from the computer 1, a printer-storing unit (also not shown) is prestored with programs and is for storing various data, and a printing unit that performs a printing operation in response to an instruction received from the CPU of the computer 1. The programs include: a program for a calibrating process shown in FIG. 5. The various data includes: data representing an installation date when the subject printer 2 was installed in a manner as being usable in the calibration system 1000; environment data shown in FIG. 2; toner-using-state data shown in FIG. 3: mechanism-characteristic data shown in FIG. 4; test patch data; and calibration result data shown in FIG. 10.

Each printer 2 is configured to prepare the environment data as indicative of information on the environment of the printer, and will be used for allocating the printer into one of one or more groups to be described later. FIG. 4 is a diagram showing an example of the configuration of environment data stored in the printers storing unit of each printer 2. The printer-storing unit in each printer 2 stores, as environment data, an average temperature and an average humidity inside the printer 2 for the past one week. These numerical values have been acquired by using a thermometer and a hygrometer (not shown) provided in the printer 2. The thermometer and hygrometer repeatedly measure the temperature and humidity inside the printer 2, respectively, at preset time intervals (e.g., once a day, or once a few hours). It is noted that the items of the environment data are not limited to those shown in FIG. 2. For example, the printer 2 may store, as the environment data, an average temperature and an average humidity for each of a plurality of past periods. Further, the printer 2 may store parameters other than temperature and humidity.

Each of the computer 1 and the printers 2 has a set of identification data (e.g., IP address) identifying the subject device. In each printer 2, the actual print density varies depending on: (1) how much toner has been used or how many sheets have been printed (toner-using state data); (2) what types of components, such as toner, photosensitive body, and a fixing device make up the printer (mechanical factor); and (3) the environmental factor such as temperature and humidity.

Each printer 2 stores the toner-using-state data in the printer-storing unit thereof. FIG. 3 shows an example of configuration of the toner-using-state data. As shown in FIG. 3, the toner-using-state data for each printer 2 contains the number of sheets that the printer 2 has printed by using each type of toner. Each printer 2 updates the toner-using-state data every time the printer 2 executes the printing process.

Further, each printer 2 stores the mechanism-characteristic data in the printer-storing unit thereof. FIG. 4 shows an example of the mechanism-characteristic data. As shown in FIG. 4, the mechanism-characteristic data for each printer contains version information of the respective components of the printer 2 (toner, photosensitive body and fixing device, in this example). The mechanism-characteristic data is not limited to the data shown in FIG. 4. For example, the mechanism-characteristic data may contain the version information of any other components of the printer 2. Moreover, the mechanism-characteristic data may contain the model numbers, product numbers, etc. of the components of the printer 2, instead of the version information thereof.

The amount of changes in print density can be formulated in terms or the toner consumption and in terms or the mechanical factors.

For example, the print density "Dp" that the printer 2 will actually obtain for each color of toner in response to the input density "D" indicative of a target print density can be formulated as follows dependently on the number of prints or copies "x" that the printer has attained:

$$Dp=D+(ax+b)$$

wherein numbers "a" and "b" are constant numbers.

So, in order to compensate for the toner-using state dependent change in the actual print density "Dp", the input density "D" should be corrected into a corrected input density "D'" as follows:

$$D'=D-(ax+b).$$

It is noted that equations other than the above-described equation may be used to formulate the print density in terms of the number of copies.

Print density changes resulting from mechanical factor is independent from the number of prints. The print density "Dp" that the printer 2 actually obtains in response to the input density "D" for each color of toner can be formulated by using the following equation:

$$Dp=f(D)$$

where function "f" is determined based on the mechanism-characteristic data.

So, in order to compensate for the mechanism-factor-dependent change in the actual print density "Dp", the input density "D" should be corrected into a corrected input density "D'" as follows:

$$D'=f^{-1}(D)$$

Contrarily, the amount of changes in the print density can hardly be formulated in terms of the environmental factor (temperature and humidity). Hence, each printer 2 has to perform a calibrating process to obtain the set of density-correcting data as correction data (FIG. 9) that can correct the input density in order to compensate for the changes depending on the environmental factor.

Next, the calibrating process will be described in detail with reference to FIGS. 5-10. Each printer 2 stores the print patch data in the printer-storing unit thereof. The print patch data includes input densities "D" varying at 20%-intervals. Each printer 2 is configured to start the calibrating process, upon receiving an instruction to perform calibration from the computer X, the printer 2 performs the calibrating process and stores density-correcting data acquired in the calibrating process in the printer-storing unit thereof.

For example, the user can input to the computer 1 the instruction instructing his/her desired printer 2 to perform the calibrating process, at a prescribed timing. More precisely, the user operates an input unit (not shown) of the computer 1. In response to the instruction input by the user, the computer 1 outputs, to the user's desired printer 2, instruction signals instructing to perform the calibrating process. Alternatively, the user may directly operate an input unit in each printer 2, thereby to instruct that the calibrating process be performed. Upon receiving the instruction, the user's desired printer 2 executes the calibrating process. By executing the calibrating process, the printer 2 creates a set of lookup tables (density-correcting data), and stores, in the printer-storing unit thereof, the density-correcting data together with creating-time data indicative of the date and time when the density-correcting data is created as shown in FIG. 10. The density-correcting data and the creating-time data serve as calibration result data.

Figure 5:
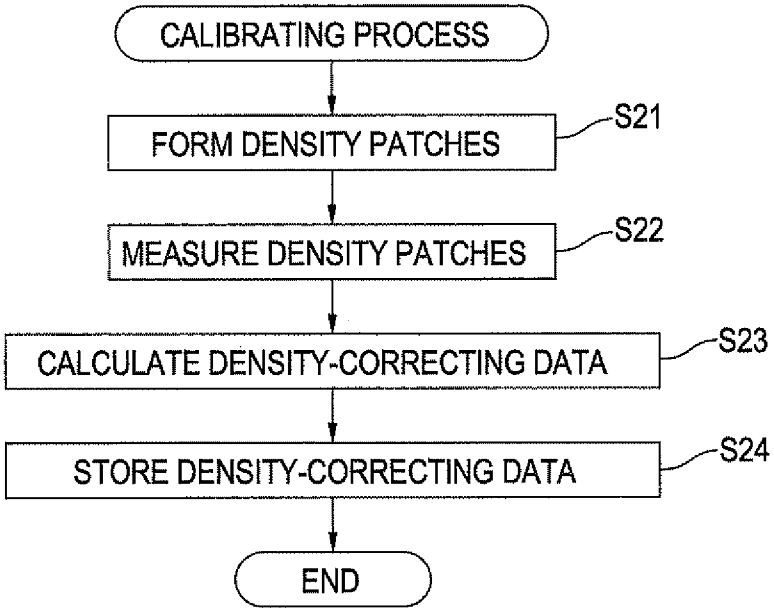
FIG. 5 is a flowchart explaining a calibrating process executed by a printer.

FIG. 5 is a flowchart explaining the calibrating process performed by each printer 2. When the calibrating process starts, in S21, the printer 2 reads the print patch data from the printer-storing unit thereof, corrects the print patch data to compensate for print-density changes resulting from the toner-using state and the mechanical characteristics of the printer, and forms density patches (FIG. 6) on a recording medium conveyor belt provided in the printer 2 (FIG. 7), based on the corrected print patch data.

More specifically, by using the toner-using-state data shown in FIG. 3, the printer 2 corrects, for each color, the input densities "D" in the print patch data into first corrected input densities "Dt" as follows:

$$Dt=D-(ax+b).$$

Next, by using the mechanism-characteristic data shown in FIG. 4, the printer 2 corrects, for each color, the first corrected input densities "Dt" into second corrected input densities "Dm" as follows:

$$Dm=f^{-}(Dt).$$

The printer 2 forms density patches based on the second corrected input densities "Dm" for each color.

Figure 6:
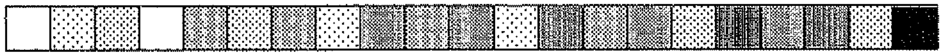
FIG. 6 is a diagram illustrating an example of density patches.

The printer 2 may form the density patches on a photosensitive body or an intermediate transfer belt provided in the printer 2. Each density patch is of a rectangular shape and has a corresponding uniform density. FIG. 6 is a diagram illustrating an example of the density patches. The density patches include four groups of density patches that are formed by four colors, i.e., cyan, magenta, yellow and black, respectively, each group having density patches whose original input densities "D" are each varying at 20%-intervals. The density patches may be another type of patches.

Figure 7:
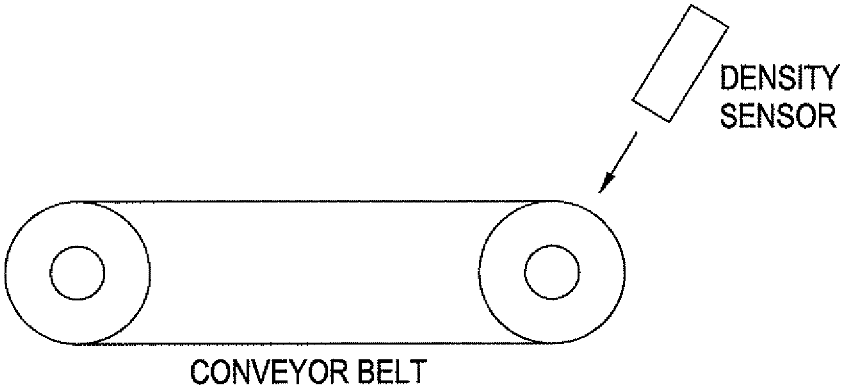
FIG. 7 is a diagram explaining how a density sensor is used to measure the density patches formed on a conveyor belt in the printer.

Returning to FIG. 5, the printer 2 measures densities of the density patches formed on the conveyor belt in S22. Specifically, a density sensor incorporated in the printer 2 is controlled to measure densities of the density patches as shown in FIG. 7. FIG. 7 is a diagram explaining how the density sensor measures the densities of the density patches formed on the recording medium conveyor belt.

Returning to FIG. 5, in S23 the printer 2 calculates, for each color, density-correcting data (FIG. 9) that can compensate for differences between the densities actually detected by the sensor (as referred to "measured values") and the desirable densities (as referred to "target values"). The density-correcting data can compensate for the changes in the print density, resulting from the environment in which the printer 2 is installed.

Figures 8, 9:
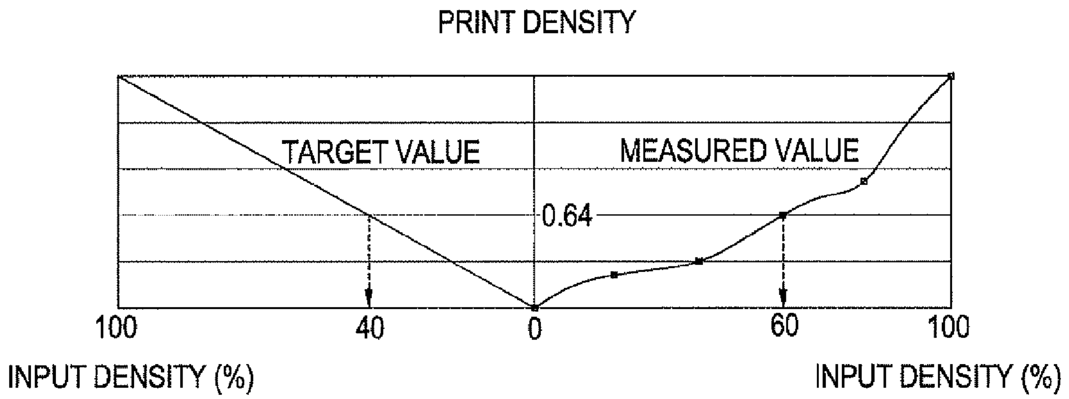
FIG. 8 is a graph representing a relation among input densities, measured densities and target densities.
FIG. 9 is diagram showing an example of a lookup table showing input densities and corrected input densities as density-correcting data.

How the density-correcting data of FIG. 9 are corrected for one color of toner will be explained in detail below. FIG. 8 is a graph representing the relation between the original input densities "D" and actual print densities for the one color of toner. Specifically, the left half part of FIG. 8 shows the relation between the original input densities "D" and the target densities, and the right half shows the relation between the original input densities "D" and the measured densities of the density patches.

In order to create the density-correcting data for each color of toner, the printer 2 determines first a density value supposed to be measured when each of all the input density values CEDE ranging from 0% to 100% is inputted, by interpolating the measured densities. For example, the printer 2 may interpolate the measured density values by using a spline interpolation, to thereby create the right half part of the graph of FIG. 8.

Then, the printer 2 compares, for each input density "D", the target density value and the density value measured or supposed to be measured. Based on the result of this comparison, the printer 2 creates a lookup table shown in FIG. 9 for converting the original input densities "D" into corrected densities. In the lookup table of FIG. 9, the corrected densities are set in one to one correspondence with the input densities "D" that are arranged at an interval of 1%. In the manner described above, the printer 2 creates a lookup table for each of all the colors of toner. The printer 2 sets the lookup tables for all the colors of toner as density-correcting data.

The left part of FIG. 8 shows that the target density is 0.64 when the input density "D" is 40%. The right part of FIG. 8 shows that the measured density is 0.64 when the input density "D" is 60%. So, the printer 2 creates the lookup table of FIG. 9 convert or correct the input density "D" of 40% to 60%.

In the above description, the input density ranges from 0% to 100%. However, the input densities may be represented as numerical values in the range of 0 to 255, rather than in the range of 0 to 100%.

Returning to FIG. 5, the printer 2 stores the density-correcting data created in S23, in the printer-storing unit thereof, together with the creating-time data indicative of the date and time when the density-correcting data is created (S24). Thus, the calibration result data is generated and stored in the printer-storing unit of the printer 2. FIG. 10 is a diagram showing an example of the data configuration of the calibration result data. As shown in FIG. 10, the calibration result data has a pair of data items of density-correcting data and creating-time data. The printer 2 sends the density-correcting data stored in the printer-storing unit to the computer 1 when the printer 2 receives from the computer 1 a request signal for the density-correcting data.

Figure 11:
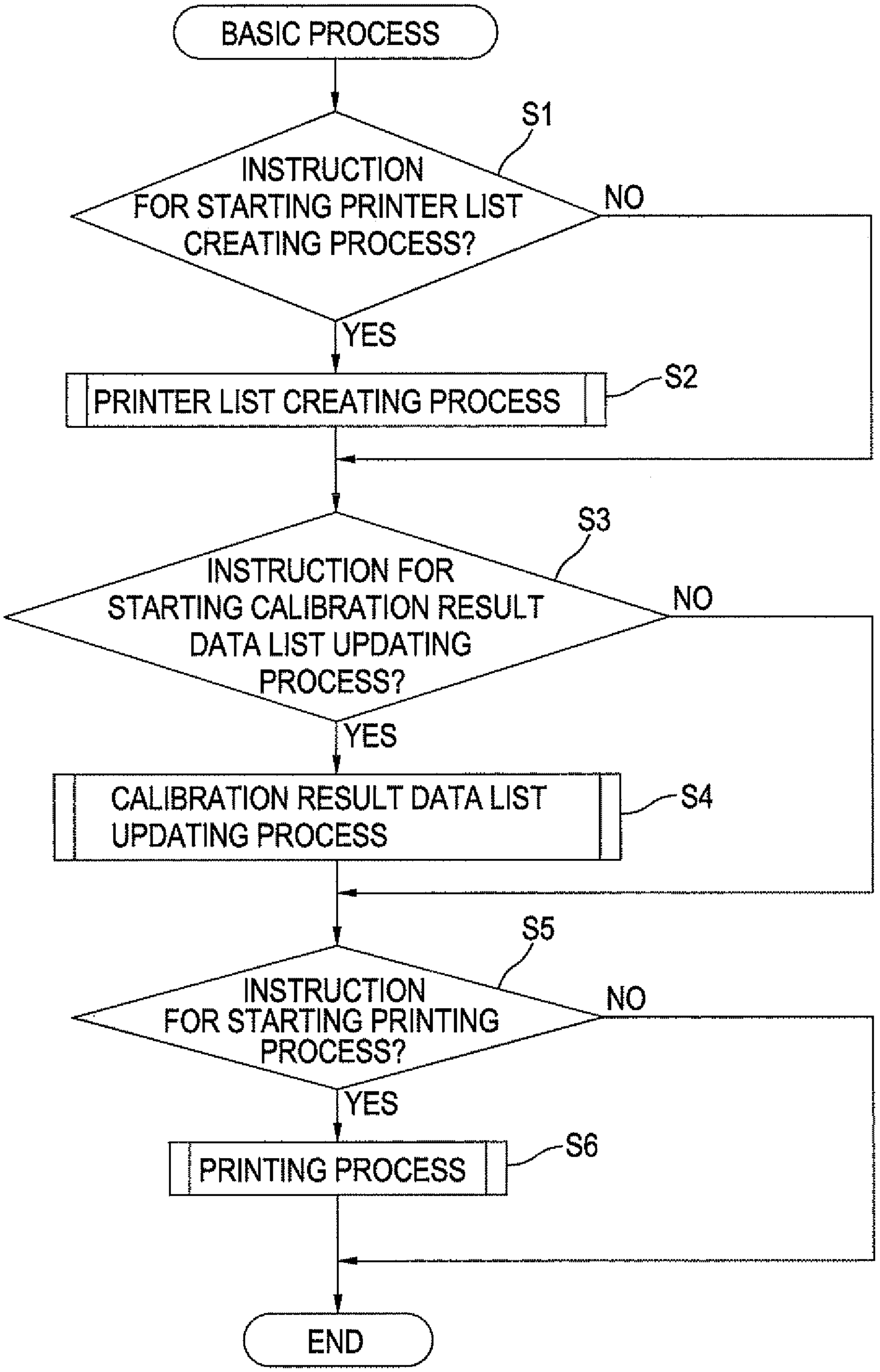
FIG. 11 is a flowchart explaining a basic process executed by the computer.

Next, the basic process executed by the computer 1 will be described below. FIG. 11 is a flowchart explaining the basic process. This process is repeated at regular time intervals (for example, 20 ms). The basic process is configured of three sub-processes. The first sub-process is a process of creating a printer list shown in FIG. 15 (S1 and S2). The second sub-process is a process for updating a density-correction parameter list shown in FIG. 18 (S3 and S4). The third sub-process is a printing process (S5 and S6).

When the computer 1 starts the basic process, the computer 1 first determines whether a condition for starting the printer list creating process is satisfied in S1. The decision is made affirmative in S1 when an instruction, instructing to start the printer list creating process, is issued from a prescribed process at a prescribed timing, or when a user of the computer 1 performs an operation to issue an instruction to start the printer list creating process.

If the computer 1 determines that the instruction for starting the printer list creating process is issued (S1: YES), the computer 1 performs the printer list creating process in S2. The printer list creating process will be described later in detail with reference to FIGS. 12-15.

On the other hand, if the computer 1 determines no instruction for starting the printer list creating process is issued (S1: NO), the process proceeds to S3.

In S3, the computer 1 determines whether the condition for starting the calibration result data list updating process is satisfied. The decision is made affirmative in S3 when an instruction, instructing to start the calibration result data list updating process, is issued from a prescribed process at a prescribed timing or when the user performs an operation for issuing the instruction to start the calibration result data list updating process.

If the computer 1 determines that the instruction for starting the calibration result data list updating process is issued (S3: YES), the computer 1 performs the calibration result data list updating process in S4. The calibration result data list updating process will be described later in detail with reference to FIGS. 16-18.

On the other hand, if the computer 1 determines that no instruction for starting the calibration result data list updating process is issued (S3: NO), the process proceeds to S5.

In S5, the computer 1 determines whether a condition for starting the printing process is satisfied. The decision is made affirmative in S5 when an instruction, instructing to start the printing process, is issued from a prescribed process at a prescribed timing. The decision is also made affirmative when the user performs an operation for issuing the instruction to perform the printing process.

If the computer 1 determines that an instruction for starting the printing process is issued (S5: YES), the computer 1 performs the printing process in S6. The printing process will be described later in detail with reference to FIGS. 19-21.

On the other hand, if the computer 1 determines that no instruction for starting the printing process is issued (S5: NO), the computer 1 ends the basic process.

Next, the printer list creating process performed by the computer 1 in S2 will be described in detail with reference to FIGS. 12-15.

Figure 12:
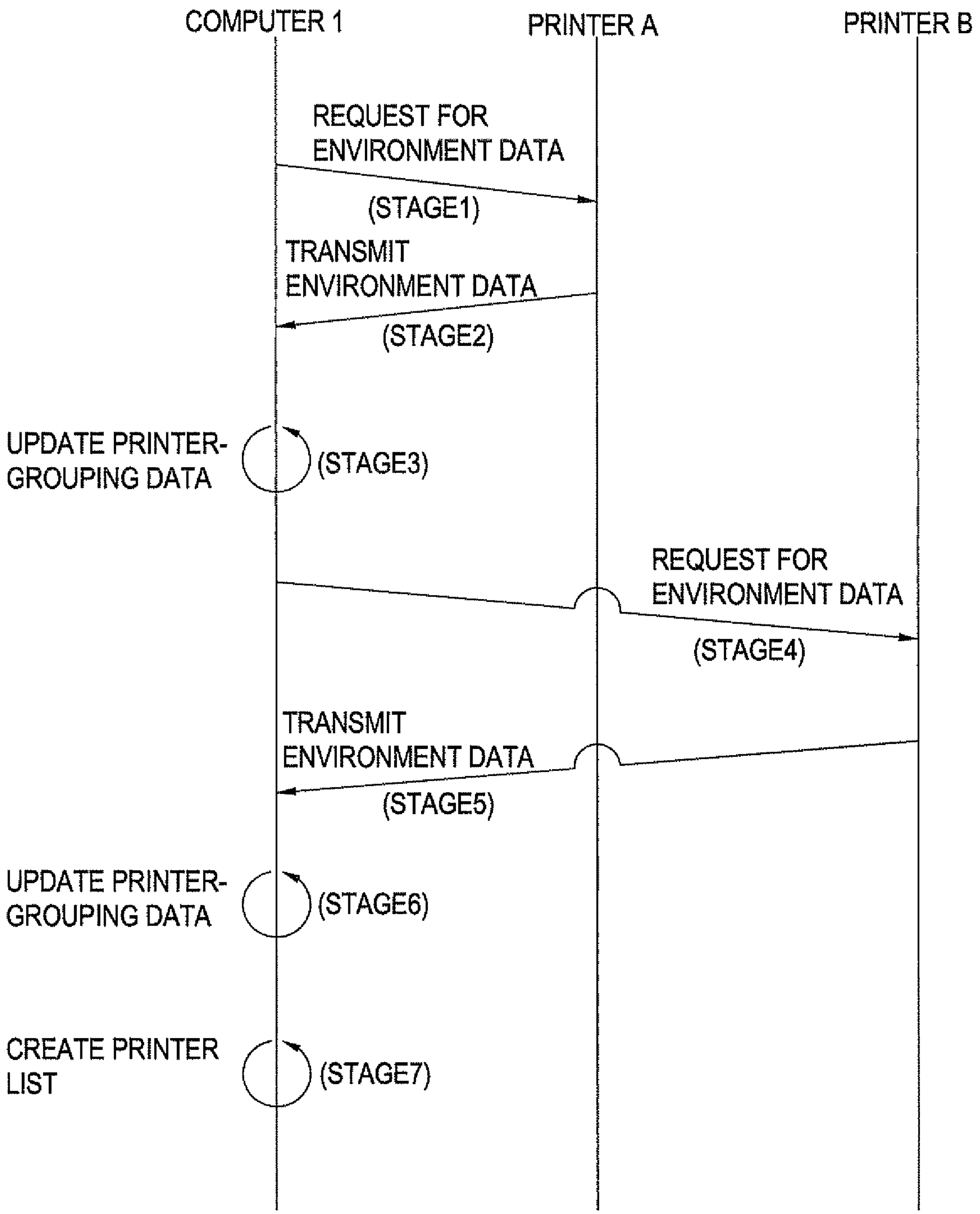
FIG. 12 is a diagram showing how data is exchanged between the computer and the printers during a printer list creating process.

FIG. 12 is a diagram explaining how data is exchanged between the computer 1 and each printer 2 during the printer list creating process. It will be assumed that two printers A and B are connected to the computer 1 in the case shown in FIG. 12.

The computer 1 outputs, to each of the printers A and B, request signals requesting the printer to send to the computer 1 environment data (FIG. 2) that is stored in the printer-storing unit of the printer (STAGE 1 and STAGE 4). In this embodiment the computer 1 transmits the request signals to printer A (STAGE 1), before the computer 1 transmits the request signals to printer B (STAGE 4). However, the computer 1 may simultaneously transmit the request signals to all the printers 2 connected to the computer 1.

Upon receiving the request signals, each printer A or B transmits, to the computer 1, the environment data of FIG. 2 stored in the printer-storing unit provided therein (STAGE 2 and STAGE 5).

On, receiving the environment data from the printer A or printer B, the computer 1 updates the printer-grouping data (STAGE 3 or STAGE 6). The printer-grouping data is indicative of information on the environments of all the printers 2 connected to the computer 1, and is used for dividing all the printers into one or more groups.

Figures 13, 14:
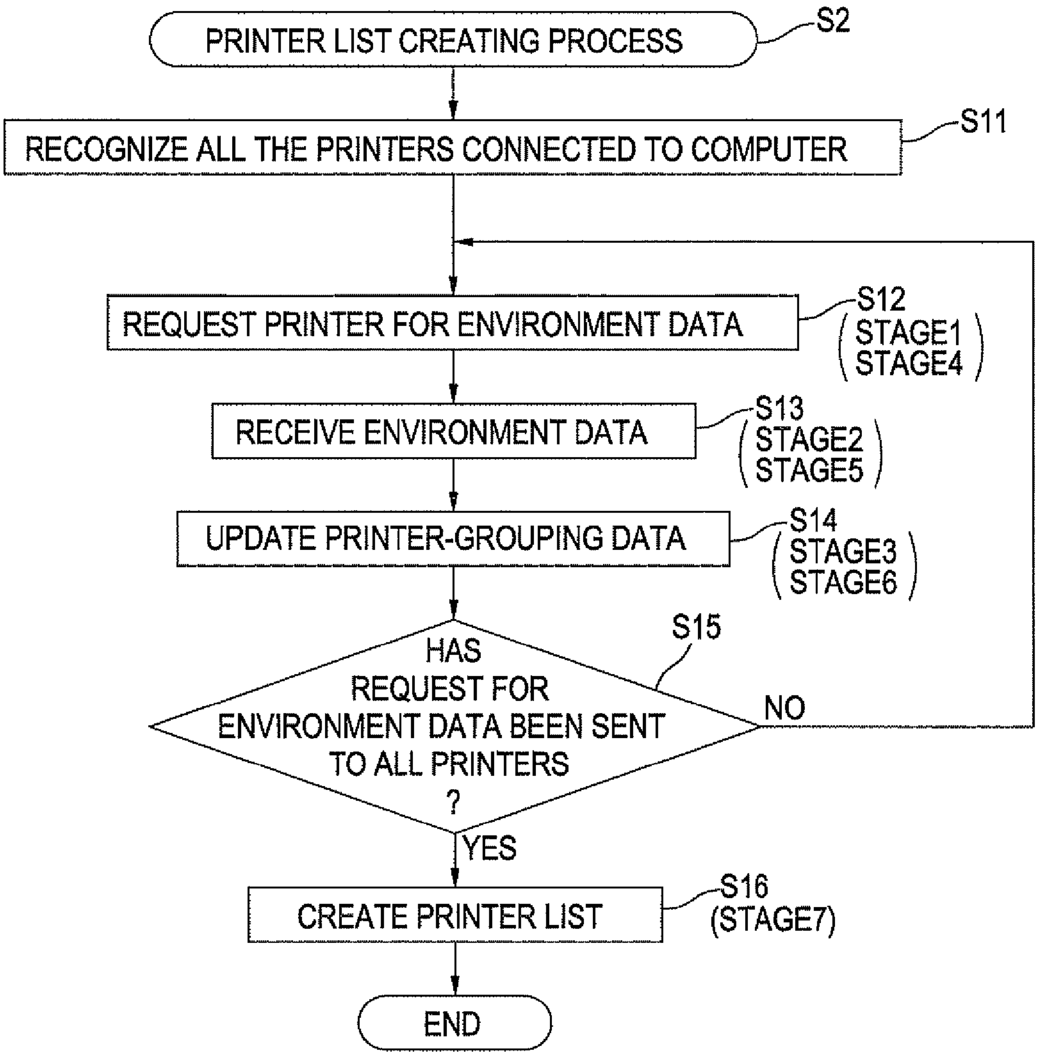
FIG. 13 is a flowchart explaining the printer list creating process performed by the computer.
FIG. 14 is a diagram showing an example of the configuration of printer-grouping data.

FIG. 14 is a diagram showing an example of the configuration of the printer-grouping data. As shown in FIG. 14, the computer 1 stores, in the form of a list, the environment data received from the respective printers 2, thereby updating the printer-grouping data. It is noted that the items of the printer-grouping data are not limited to those shown in FIG. 14. That is, the computer 1 may store, as the printer-grouping data, various data items other than the temperature and humidity in association with each printer 2.

Returning to FIG. 12, after receiving the environment data from all the printers 2 connected to the computer 1 and updating the printer-grouping data based on the received environment data, the computer 1 creates the printer list shown in FIG. 15 described later (STAGE 7).

The printer list creating process executed by the computer 1 will be described with reference to FIG. 13. When the computer 1 starts the printer list creating process of S2, the computer 1 first recognizes in S11 all the printers 2 that are presently being connected to the computer 1. Instead, the computer 2 may recognize all the printers 2 that are being connected to the computer 1 when the computer 1 is started. Or, the computer 1 may continuously monitor all the printers 2 that are being connected to the computer 1. Alternatively, the computer 1 may store a list of the printers 2 connected to the computer 1 in a particular printer-staring unit provided therein, and may refer to this list in S11.

In S12, the computer 1 transmits, to one of the recognized printers 2, a request signal requesting the printer 2 to send environment data (FIG. 2) to the computer 1. On receiving the request signal, the printer 2 transmits its own environment data, to the computer 1. In S13, the computer 1 receives the environment data from the printer 2.

In S14, the computer 1 updates the printer-grouping data (FIG. 14) based on the environment data received from the printer 2. For example, when the computer 1 receives environment data from the printer A, the computer 1 updates the temperature and humidity data items that are contained in the printer-grouping data in association with the printer A. If the computer 1 has not yet created the printer-grouping data of FIG. 14, the computer 1 creates the printer-grouping data in S14.

In S15, the computer 1 determines whether the computer 1 has requested all printers recognized in S11 for the environment data. If the computer 1 has not yet requested all printers recognized in S11 for the environment data (S15: NO), the computer 1 returns to S12, after determining which printer 2 the computer 1 should request for the environment data next.

If the computer 1 has requested all printers recognized in S11 for the environment data (S35: YES), the process proceeds to S16.

In S16, the computer 1 creates the printer list based on the printer-grouping data updated in S14. After creating the printer list, the program proceeds to S3 (FIG. 11). FIG. 15 is a diagram illustrating an example of data configuration of the printer list.

In the printer list shown FIG. 15, unique printer numbers 1-6 are allocated to the respective printers A-F connected to the computer 1. Further, printer names and installation dates of the printers A-F are stored in the printer list, as printer information. The installation date for each printer 2 indicates the date when the subject printer 2 became usable in the calibration system 1000. It is noted that each printer 2 stores therein the data representing its installation date. Each printer 2 sends the data representing its own installation date to the computer 1 at a prescribed timing. For example, each printer 2 may transmit to the computer 1 in STAGE 2 or STAGE 5 shown in FIG. 3 the data representing its own installation date together with the environment data.

A plurality of groups are defined in one to one correspondence with a plurality of ranges for a combination of temperature and humidity. Among all the printers, those printers, whose temperature and humidity fall within the same range among the plurality of ranges, are set as forming a corresponding one of the plurality of groups. To each group, an environment ID identifying the corresponding range is assigned. In the example of FIG. 15, the same environment ID "A" is assigned to printers A, B and F, which are regarded as being in the same environment. Likewise, the same environment ID "B" is assigned to printers C, D and E, which are regarded as being in the same environment. Furthermore, environment printer numbers are allocated to respective printers 2 in each group to identify the printers in the same group. In the example of FIG. 15, the environment printer numbers "1", "2", and "3" are assigned respectively to the printers A, B, and F in the environment with the environment ID "A". The environment printer numbers "1", "2", and "3" are assigned respectively to the printers C, D, and E in the environment with the environment ID "B".

The range of temperature and the range of humidity, which are associated with each environment, can be set arbitrarily.

As described above, in the printer list creating process, the printers 2 are divided into one or more groups in accordance with the environment in which the printers 2 are installed as described above. According to the embodiment, the printers 2 having the same or similar environmental factor (temperature and humidity) are grouped into the same group so that the printers belonging to the same group can share the same density-correcting data. The printer-grouping data (FIG. 14) may include the model numbers of the printers and/or the model numbers or the product numbers of the printer components that make up the printers, for example. The printers 2 may be divided into a larger number of groups in accordance with not only the environments but also the model numbers of the printers 2 and/or the model numbers or the product numbers of the printer components.

Next, the calibration result data list updating process of S4 (FIG. 11) will be described in detail with reference to FIGS. 16-18.

Figure 16:
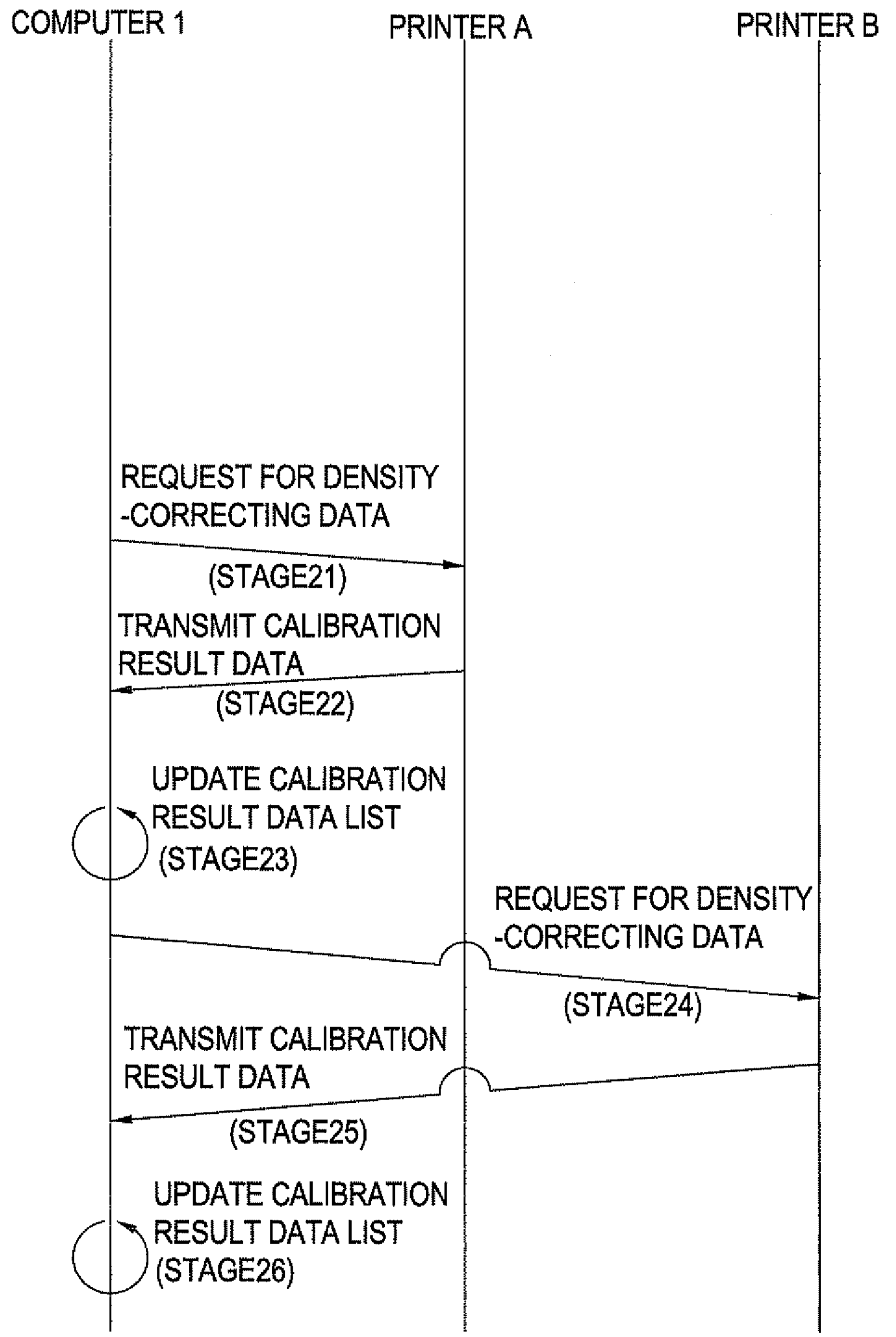
FIG. 16 is a diagram showing how data is exchanged between the computer and printers during a calibration result data list updating process.
Figure 17:
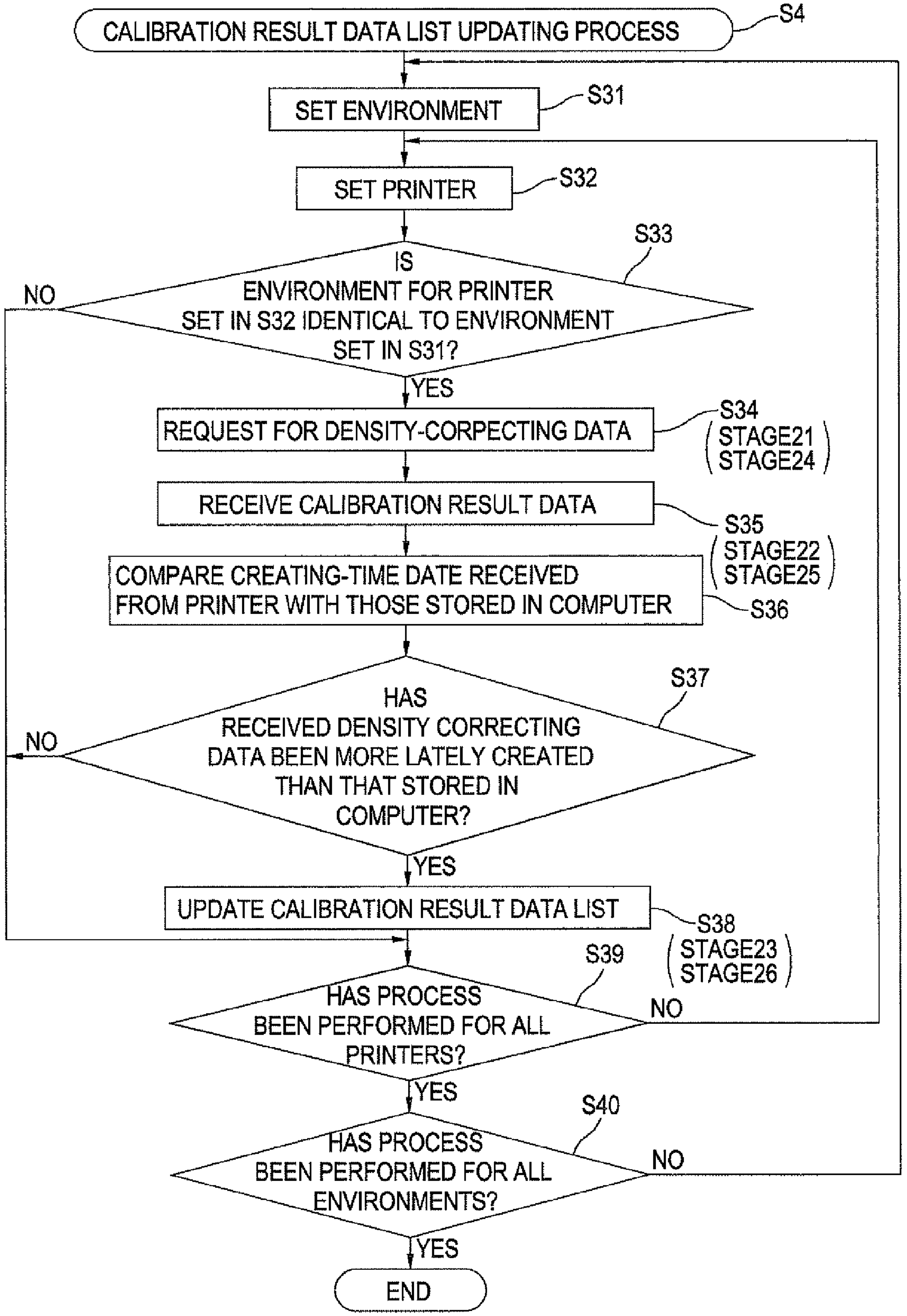
FIG. 17 is a flowchart explaining the calibration result data list updating process executed by the computer.

FIG. 16 is a diagram showing how data is exchanged between the computer 1 and the printers 2 (printers A and B) during the calibration result data list updating process.

In the calibration result data list updating process, the computer 1 acquires the calibrating result data (FIG. 15) stored in all the printers 2, and updates the calibration result data list (FIG. 16) based on the calibrating result data acquired from the printers 2.

FIG. 16 is a diagram showing an example of data configuration of the calibration result data list stored in the computer-storing unit provided in the computer 1. As shown in FIG. 18, the calibration result data list contains, for each of the environment IDs: the calibration result data (data of the density-correcting data and the creating-time data of the density-correcting data); the name of the source printer 2 that has transmitted the calibration result data; and the environment printer number of the source printer 2.

As shown in FIG. 16, the computer 1 outputs request signals to the printers A and B, requesting the printers to send the computer 1 the calibration result data stored in the printers A and B (STAGES 21 and STAGS 24).

On receiving the request signal, each of the printers A and B transmits to the computer 1 the calibrating result data of FIG. 10 (STAGE 22 and STAGE 25).

On receiving data of the calibration result data from the printer A or B, the computer 1 updates selectively the calibration result data list of FIG. 18 (STAGE 23 and STAGE 26).

Next, the calibration result data list updating process executed by the computer 1 will be described with reference to the flowchart of FIG. 17. By performing this process, the computer 1 determines, as a common density-correcting data for all the printers 2 belonging to each group (environment), one set of density-correcting data that has been created latest among all the density-correcting data that have been created through the calibrating processes executed in those printers 2 that belong to the subject group.

In S31, the computer 1 sets one environment ID (group), for which the density-correcting data should be updated, by referring to the printer list of FIG. 15. In the example of the printer list shown in FIG. 15, the computer 1 sets the environment ID "A" or "B".

In S32, the computer 1 sets one printer among all the printers listed in the printer list of FIG. 15. In the printer list shown in FIG. 15, the computer 1 sets the printer by using its printer number. For example, the computer 1 successively sets all the six printers A through F in this order corresponding to the order of the printer numbers "1" through "6", while repeating the processes S32-S39 to be described later.

In S33, the computer 1 determines whether the environment ID for the printer 2 set in S32 is identical to the environment ID set in S31. If the environment ID for the printer set in S32 is identical to the environment ID set in S31 (S33: YES), the process proceeds to S34. If the environment ID for the printer set in S32 is different from the environment ID determined in S31 (S33: NO), the process proceeds to S39.

In S34, the computer 1 transmits, to the printer 2 set in s32, a request signal requesting for the density-correcting data. Upon receiving the request signal, the printer 2 transmits to the computer 1 the calibration result data (FIG. 10) stored therein. In S35, the computer 1 receives the calibration result data transmitted from the printer 2.

In S36, the computer 1 compares the creating date and time indicated by the creating time-data included in the calibration result data received in S35 with the creating data and time indicated by the creating-time data stored in the calibration result data list in correspondence with the environment ID set in S31.

In S37, the computer 1 determines whether the density-correcting data in the calibration result data that has been just received from the printer 2 was created later than the density-correcting data stored in the calibration result data list for the environment ID set in S31. If the computer 1 determines that the density-correcting data that has been just received was created later (S37: YES), the process proceeds to S38. If the computer 1 determines that the density-correcting data was not created later (S37: NO), the process jumps to S39.

In S38, the computer 1 updates the calibration result data list of FIG. 18. More specifically, the computer 1 updates, with the calibration result data received in S35, the calibration result date stored in the calibration result data list for the environment ID set in S31. The computer 1 further updates, with the printer name and the environment printer number of the source printer 2 set in S32, the printer name and the environment printer number stored in the calibration result data list for the environment ID set in S31.

In S39, the computer 1 determines whether the process has been performed for all printers in the printer list shown in FIG. 15. If the process has been performed for all printers (S39: YES), the process proceeds to S40. If the process has not yet been performed for all printers (S39: NO), the process returns to S32 to set the next printer for which the process should be performed.

In S40, the computer 1 determines whether the process has been performed for all environments. If the computer 1 determines that the process has been performed for all environments (S40: YES), the computer 1 ends the calibration result data list updating process. If the computer 1 determines that the process has not yet been performed for all environments (S40, NO), the process returns to S31 to set the next environment for which the process should be performed.

Figure 19:
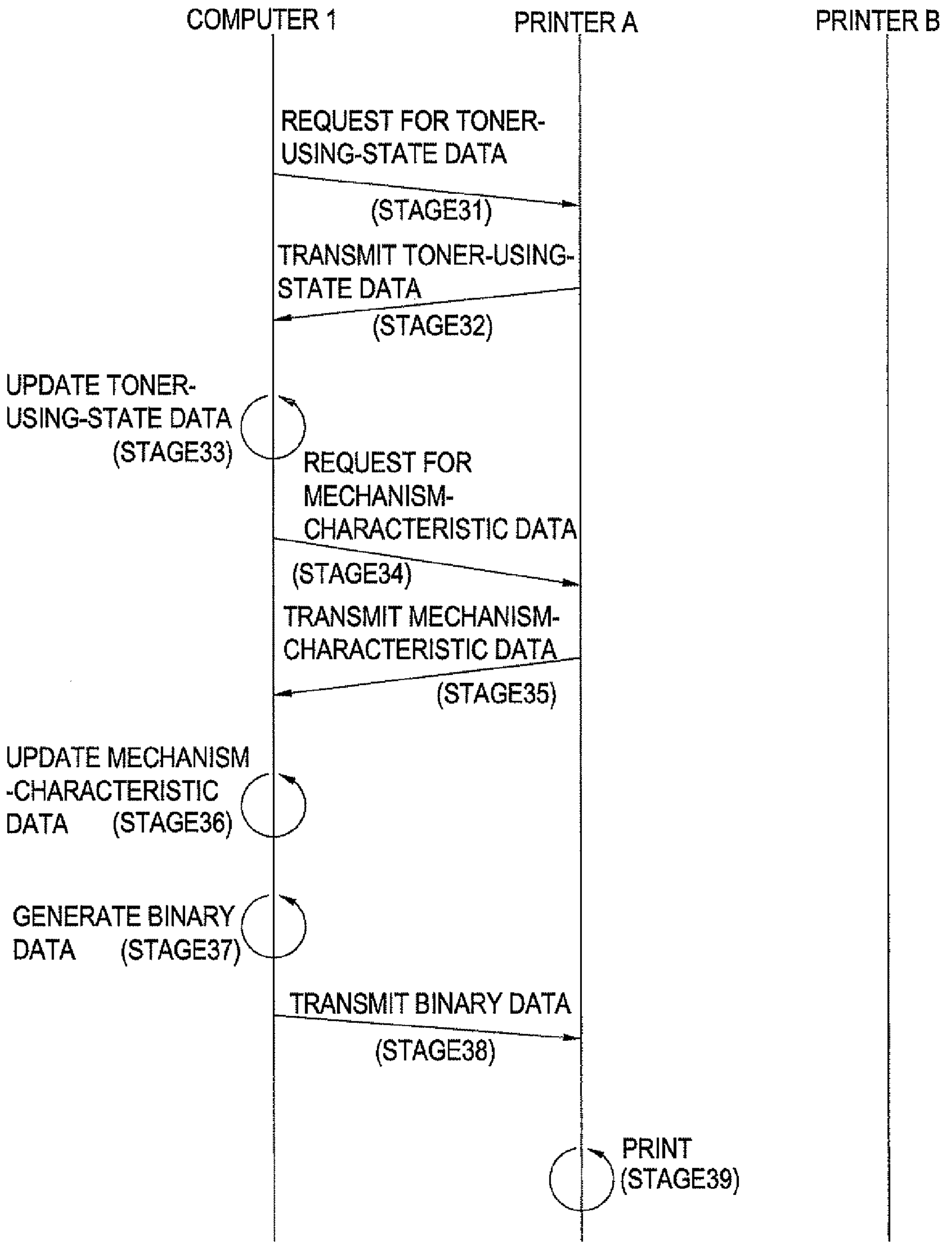
FIG. 19 is a diagram showing how data is exchanged between the computer and a printer during a printing process.
Figure 20:
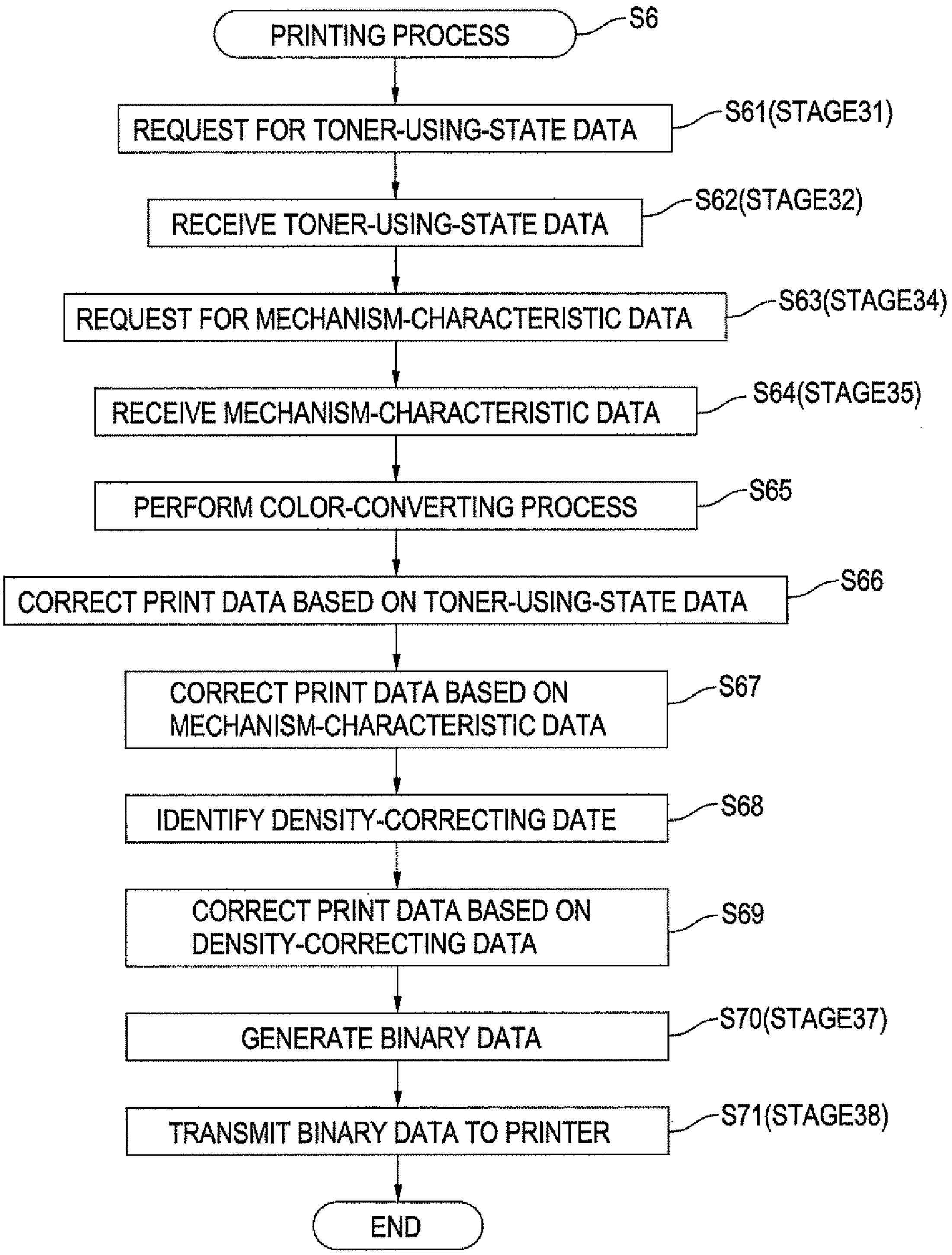
FIG. 20 is a flowchart explaining the printing process executed by the computer.

Next, the printing process performed by the computer 1 in S6 of FIG. 11 will be described with reference to FIGS. 19-21. FIG. 19 is a diagram showing how data is exchanged between the computer 1 and the printer A in the printing process when the user desires to use the printer A to print data.

The computer 1 transmits a request signal requesting the printer A to send toner-using-state data (FIG. 3) to computer 1 (STAGE 31). On receiving this request signal, the printer A transmits toner-using-state data to the computer 1 (STAGE 32). On receiving the toner-using-state data from the printer A, the computer 1 stores the toner-using-state data in the computer-storing unit thereof (STAGE 33).

Next, the computer 1 transmits, to the printer A, a request signal requesting the printer A to send mechanism-characteristic data (FIG. 4) to the computer 1 (STAGE 34). In response to this request signal, the printer A transmits mechanism-characteristic data to the computer 1 (STAGE 35). Upon receiving the mechanism-characteristic data from the printer A, the computer 1 stores the mechanism-characteristic data in the printer-storing unit thereof (STAGE 36).

After acquiring the toner-using-state data and the mechanism-characteristic data from the printer A, the computer 1 generates binary data based on image data by using the toner-using-state data and the mechanism-characteristic data acquired from printer A, and by using the density-correcting data that is for the group, to which the printer A belongs, and that has been selectively updated in S4 of FIG. 11 (STAGE 37). The process of generating the binary data will be described later in detail.

The computer 1 transmits the binary data to the printer A (STAGE 38). The printer A performs printing based on the binary data received from the computer 1 (STAGE 39).

The printing process of SE executed by the computer 1 will be described below with reference to the flowchart of FIG. 20.

In S61, the computer 1 transmits a request signal requesting for toner-using-state data to the printer 2 that the user desires to use to perform the printing process (which will be referred to as "the user's desired printer 2" hereinafter). On receiving this request signal, the user's desired printer 2 transmits the toner-using-state data to the computer 1.

In S62, the computer 1 receives the toner-using-state data transmitted from the printer 2 and stores the toner-using-state data in the computer-storing unit of the computer 1.

In S63, the printer 1 transmits a request signal requesting for mechanism-characteristic data to the user's desired printer 2. In response to this request signal, the printer 2 transmits the mechanism-characteristic data to the computer 1.

In S64, the computer 1 receives the mechanisms characteristic data transmitted from the printer 2 and stores the mechanism-characteristic data in the computer-storing unit of the computer 1.

In S65, the computer 1 performs a color-converting process for creating print data based on image data. Specifically, the computer 1 determines relation between the color space defined in the computer 1 (RGB space, for example) and the color space defined in the printer 2 (CMYK space, for example) by using a color profile. For example, the computer 1 converts an RGB-pixel value (=255, 0, 0) (image data) to a CMYK-pixel value (=0, 220, 133, 0) (print data). Thus, the print data includes input densities "D" for each color of cyan, magenta, yellow, and black.

In S66, the computer 1 corrects the print date (CMYK input densities) created in S65 based on the toner-using-state data acquired in S62 in order to compensate for the toner-using state dependent change in the print density. Specifically, the computer 1 corrects, for each color, the input densities "D" indicative of the target density into first corrected input densities "Dt" as follows.

$$Dt=D-(ax+b)$$

In S67, the computer 1 further corrects the first corrected input densities "Dt" obtained in S66 based on the mechanism-characteristic data (FIG. 4). Specifically, the computer 1 correct-s each first corrected input density "Dt" into a second corrected input density "Dm" as follows:

$$Dm=f^{-1}(Dt)$$

By virtue of the corrections effected in S66 and S67, CMYK-pixel value (=0, 220, 133, 0) is converted to CMYK-pixel value (=0, 230, 140, 0), for example.

In S68, the computer 1 refers to the printer list (FIG. 15) to identify the environment ID of the group, to which the user's desired printer 2 belongs. Thus, the computer 1 refers to the calibration result data list (FIG. 18), and identifies one set of density-correcting data for the environment ID of the environmental group, to which belongs the user's desired printer 2.

In S69, the computer 1 corrects the second corrected input densities "Dm" obtained in S67, based on the density-correcting data identified in S68. For example, if the density-correcting parameter set identified in S68 includes the lookup table as shown in FIG. 9 for one color and if the second corrected input density "Dm" for one pixel for the subject color is 102 (=40%), the second corrected input density "Dm" is corrected into 153 (−60%).

In S70, the computer 1 performs a data-converting process to create binary data based on the corrected print data obtained in S69. Specifically, the computer 1 converts the corrected print data indicating the tone level in each color to binary data indicative of the tone level in terms of area gradation. Specifically, the computer 1 creates the binary data that represents a high-density region by arranging dots with a high density and a low-density region by arranging dots with a low-density.

Figure 21:
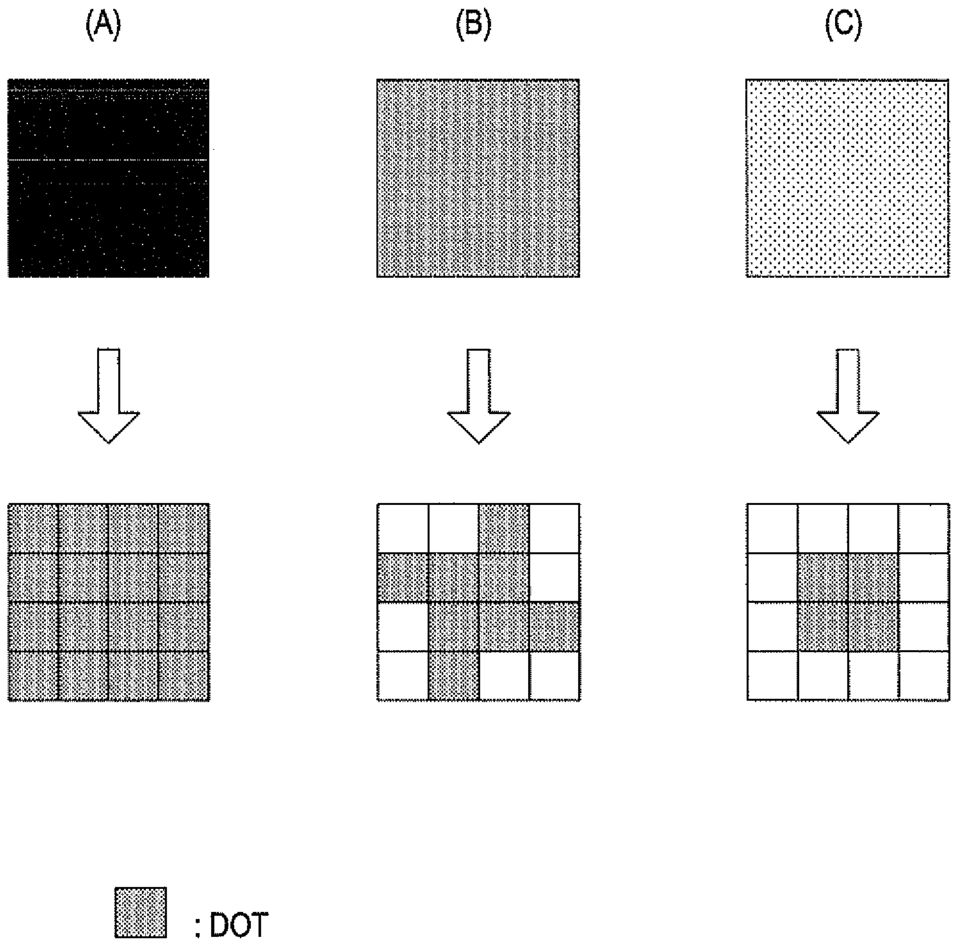
FIG. 21 is a diagram illustrating a relation between multi-level density values and binary data.

FIG. 21 is a diagram illustrating the relation between density values and binary data. The corrected print data indicative of the density value of area A is converted into binary data indicating that the area A should be formed by printing dots in the entire part of the area A. The corrected print data indicative of the density value of area B is converted into binary data indicating that the area B should be formed by printing dots in some part of the area B. The corrected print data indicative of the density value of area C is converted into binary data indicating that the area C should be formed by printing dots in some part of the area C. As shown in FIG. 21, the density value of area A is higher than the density value of area B, which in turn is higher than density value of area C. The dot density in the area A is higher than the dot density in the area 8, which in turn is higher than the dot density in the area C.

Returning to FIG. 20, in S71 the computer 1 transmits, to the printer 2, the binary data converted in S70. On receiving the binary data, the printer 2 prints an image based on the binary data received from the computer 1.

In the calibration result data list updating process, the computer 1 can determine the density-correcting data for each environment (group), based on the calibration result data transmitted from the respective printers 2, without newly performing the calibrating process. Thus, each printer can improve the quality of images to be formed, by utilizing the density-correcting data created in another printer belonging to the same environment, without newly executing the calibrating process.

While the invention has been described in detail with reference to the embodiment described above, it would be apparent to those skilled in the art that various changes and modifications may be made therein without departing from the spirit of the invention.

For example, the calibration system 1000 of FIG. 1 includes only one computer 1, but may include a plurality of computers. In this case, the plurality of computers may perform a decentralized process.

Further, any printer 2 may perform some or all of the various processes that the computer 1 performs. That is, any printer 2 may operate as a computer if the printer 2 has a processor that can execute a specific program and a printer-storing unit that can store various data temporarily or permanently. Moreover, an external apparatus connected to the calibration system 1000 by a network may perform some or all of the processes the computer 1 performs. Further, the system 1000 may employ a processor or a memory, or both, designed for practicing the embodiment, rather than the general-purpose computer 1.

Further, the flowcharts described above are no more than examples. The processes may be performed in any other ways than those explained with reference to the flowcharts.

Next, the calibration result data list updating process of S4 in FIG. 11 may be modified as described below. During the calibration result data list updating process of S4 in the embodiment described above, the computer 1 outputs instruction signals to all printers 2 to send the density-correcting data stored therein, rather than to cause the printers 2 to newly perform a calibrating process. During the calibration result data list updating process of S4 according to the modification, the computer 1 outputs an instruction signal to only a single selected printer 2, causing the printer 2 to newly perform a calibration.

Figure 22:
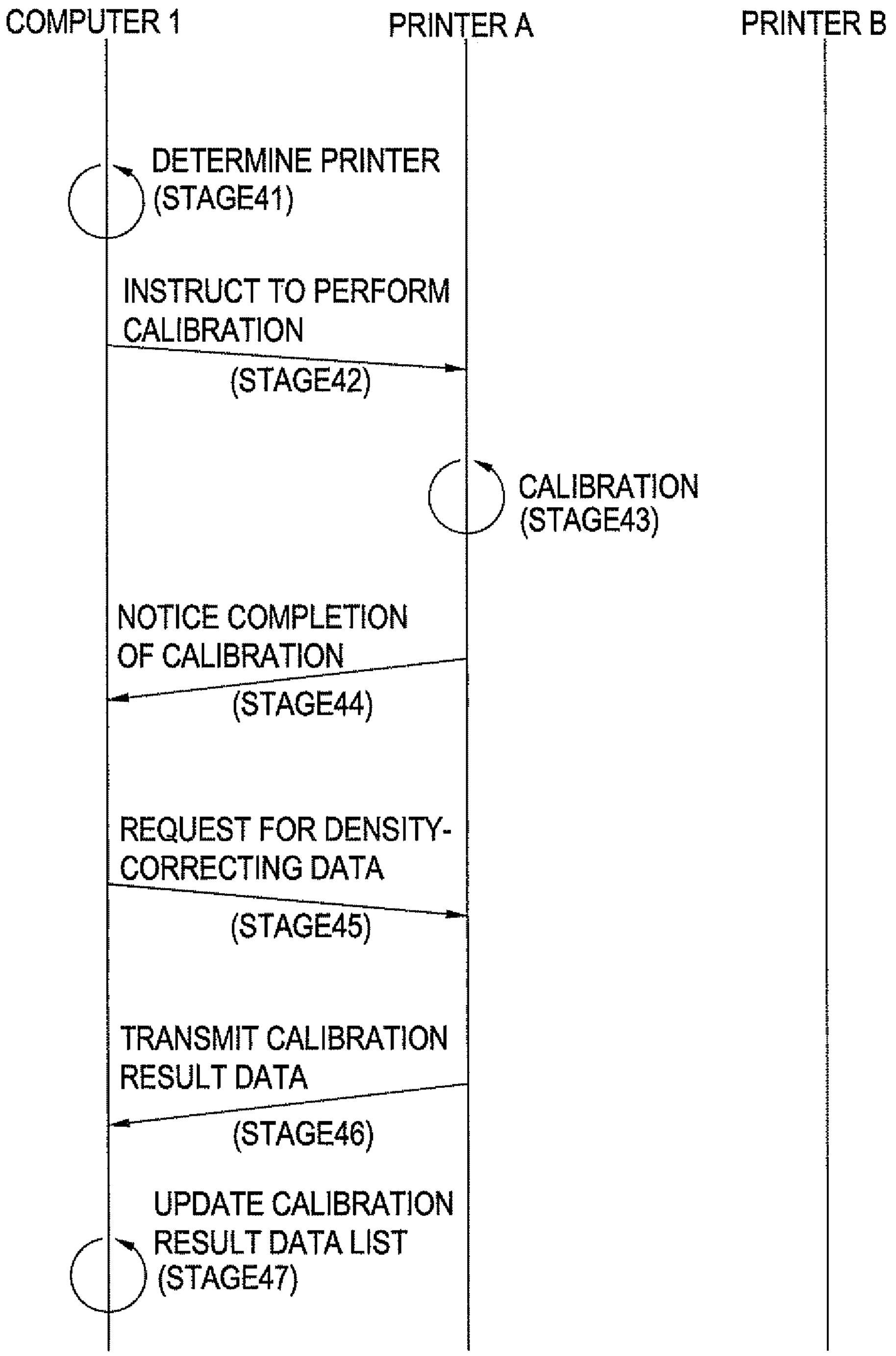
FIG. 22 is a diagram showing how data is exchanged between the computer and a printer during a calibration result data list updating process according to a modification of the embodiment.

FIG. 22 is a diagram depicting how data is exchanged between the computer 1 and the printers 2 in the calibration result data list updating process of the modification. It will be assumed that two printers A and B are connected to the computer 1 in the case shown in FIG. 22. Further, it will be assumed that the printers A and B are set in the same environment group.

The computer 1 determines a printer 2 in which calibrating process should be performed. Examples of a method for determining the printer 2 to perform calibration includes: a method of using a round-robin scheme and another method of using the date when the printer 2 was installed in the calibration system 1000.

In the example of FIG. 22, the computer 1 determines the printer A as the printer in which to perform calibrating process (STAGE 41). The computer 1 transmits to the printer A an instruction signal to instruct the printer A to perform calibrating process (STAGE 42). On receiving the instruction signal, the printer A performs calibrating process (STAGE 43).

After finishing the calibrating process, the printer A transmits a notification signal to the computer 1, informing the computer 1 of the completion of the calibrating process (STAGE 44).

Upon receiving the notification signal, the computer 1 transmits a request signal to the printer A, requesting the printer A to send a newly-determined density-correcting data to the computer 1 (STAGE 45).

On receiving the request signal, the printer A transmits the density-correcting data to the computer 1 (STAGE 46).

Using the density-correcting data received, the computer 1 updates the calibration result data list (STAGE 47).

Figure 23:
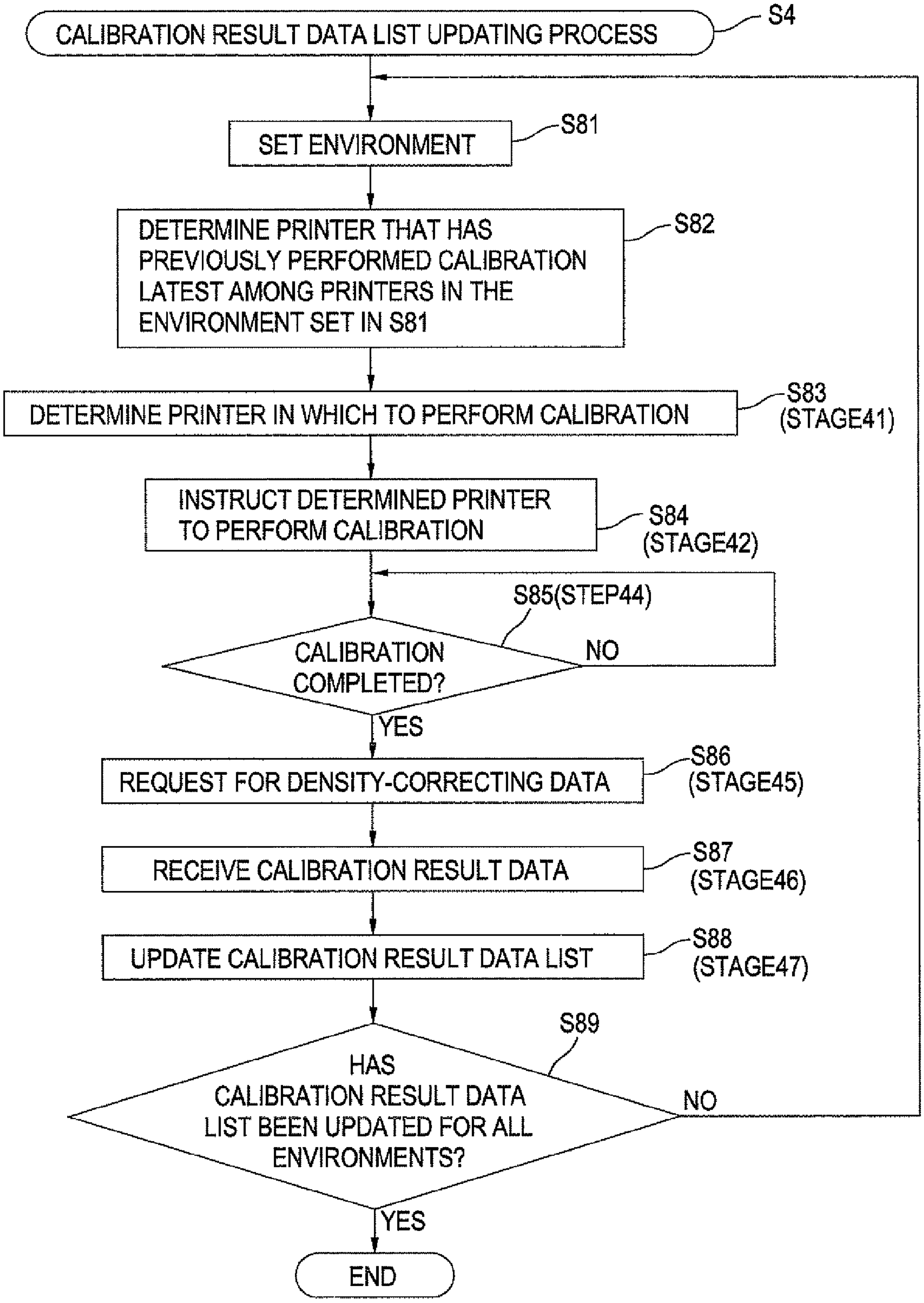
FIG. 23 is a flowchart explaining the calibration result data list updating process using a round-robin scheme according to the modification.

In this modification, a printer 2 to perform calibration is determined by using a round-robin scheme. FIG. 23 is a flowchart explaining the calibration result data list updating process that uses the round-robin scheme.

First, in S81, the computer 1 sets an environment for which the density-correcting data should be updated, by using the environment ID contained in the calibration result data list. In the example of FIG. 18, the computer 1 sets environment ID "A" or "B".

In S82, the computer 1 identifies the printer 2 that belongs to a group of the environment set in S81 and that has performed a calibrating process latest among all the printers belonging to the group of the environment. The computer 1 determines the printer by referring to the environment printer number contained in the calibration result data list of FIG. 18. If no printer has performed the calibrating process yet, the computer 2 sets, according to a prescribed method, one among the printers belonging to the group of the environment set in S81.

In S83, the computer 1 determines a printer 2 in which to perform the calibrating process. For example, the computer 1 determines, as the printer 2 in which the calibrating process should be performed, a printer whose environment printer number is equal to a new environment printer number that is obtained by incrementing the environment printer number acquired in S82 by 1. If the new environment printer number exceeds a prescribed maximum environment printer number for the environment in question, the computer 1 resets the new environment printer number to "1", and determines a printer whose environment printer number is equal to "1" as one in which to perform a calibrating process.

In S84, the computer 1 transmits, to the printer 2 determined in S83, an instruction signal instructing to perform the calibrating process. On receiving the instruction signal, the printer 2 performs the calibrating process shown in FIG. 15.

In S85, the computer 1 determines whether the printer 2 has completed the calibrating process. Thus, the process remains at S85 until the printer 2 finishes the calibrating process. If the computer 1 determines that the calibrating process has been completed (S85: YES), the process proceeds to S86. It is noted that the computer 1 determines that the calibrating process has been completed when the computer 1 receives, from the printer 2, a notification signal showing the completion of the calibrating process. Upon finishing the calibrating process, the printer 2 transmits the notification signal to the computer 1 and stores the calibration result data (FIG. 10) determined through the calibrating process in the printer-storing unit of the printer 2.

In S66, the computer 1 transmits a request signal requesting for the density-correcting data (FIG. 10) to the printer 2 which the computer 1 has instructed to perform the calibrating process. On receiving this request signal, the printer 2 transmits, to the computer 1, the density-correcting data stored in the computer-storing unit together with data representing the creating-time data when the printer 2 created the density-correcting data. Thus, the printer 2 transmits the calibration result data.

In S87, the computer 1 receives the calibration result data transmitted from the printer 2. In S88, the computer 1 updates the calibration result data list (FIG. 18) in the computer-storing unit of the computer 1 based on the calibration result data received from the printer 2.

In S89, the computer 1 determines whether the calibration result data list has been updated for all the environments set in the calibration result data list. If the computer 1 determines that the calibration result data list has been updated for all environments (S89: YES), the computer 1 ends the calibration result data list updating process. If the computer 1 determines that the calibration result data list has not yet been updated for all environments (S89: NO), the computer 1 returns to S81 to set an environment in which the density-correcting data should be updated next.

The calibration result data list updating process shown in FIG. 23 may be performed when a specific condition is satisfied. For example, the computer 1 may refer to the calibration result data list shown in FIG. 18 and determine such an environment ID, for which the difference between the present time and the creating time of the density-correcting data is greater than a prescribed value. The computer 1 performs the calibration result data list updating process, only for the determined environment ID.

The computer 1 may not update the calibration result data list for all environments each time. The computer 1 may update the density-correcting data only for an environment designated by user.

In the modification, since all printers need not perform the calibrating process, the computer 1 can reduce the cost required to perform the calibrating process.

Further, if the computer 1 performs the calibration result data list updating process at predetermined time intervals, all the printers belonging to one group sequentially perform the calibrating process. Therefore, instructions for the calibrating process will not concentrate on the same printer. Hence, no printer will keep using density-correcting data that are obtained in another printer. Therefore, print density errors that will possibly occur by using density-correcting data determined in other printers will be dispersed among the printers of the group.

Figure 24:
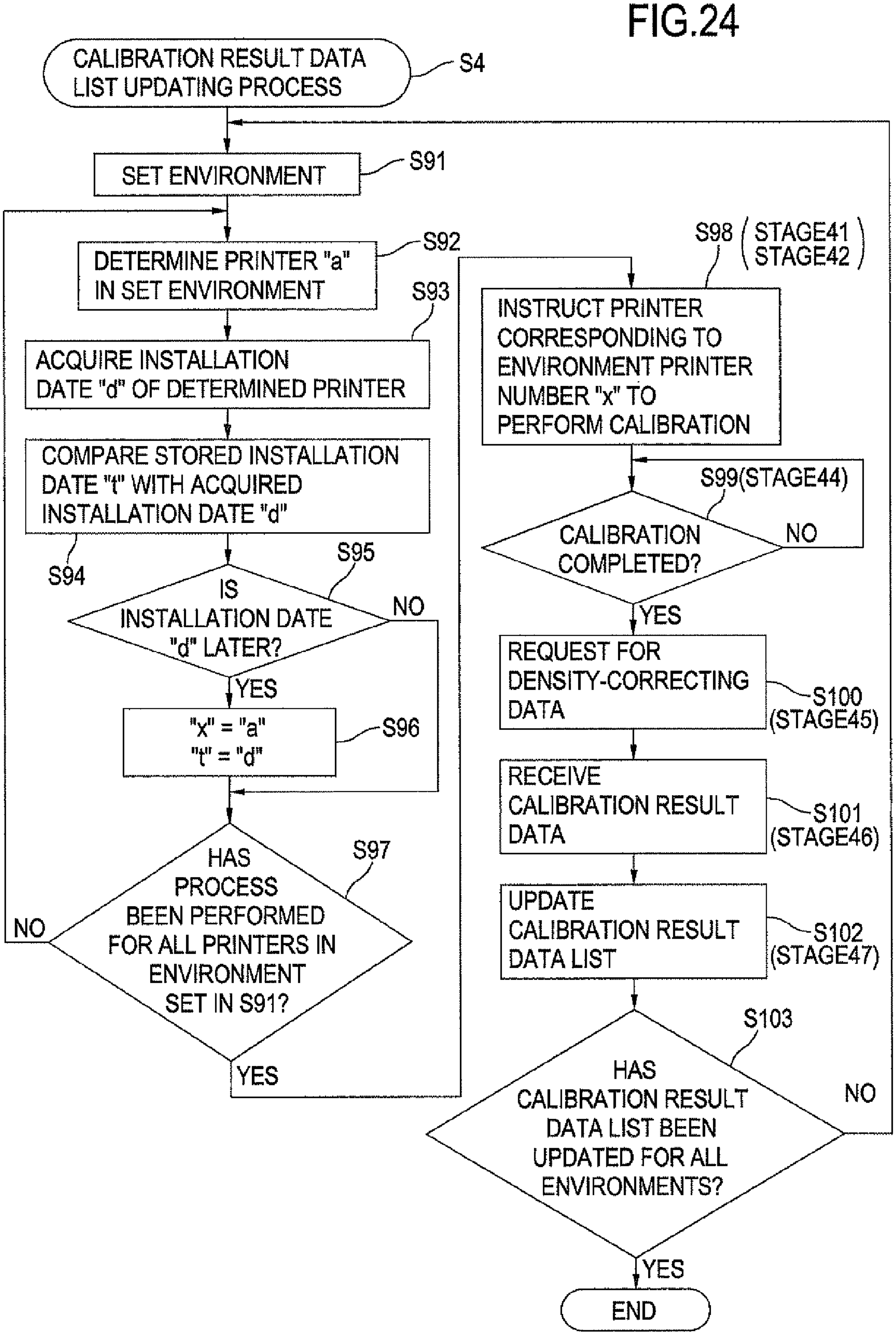
FIG. 24 is a flowchart explaining a calibration result data list updating process using a method of determining a printer in accordance with installation date according to the modification of the embodiment.

Next, a calibration result data list updating process that uses a method of determining a printer 2 in accordance with the date when the printer 2 was installed will be described. FIG. 24 is a flowchart explaining a calibration result data list updating process performed by the computer 1, in which the computer 1 determines a printer in which to perform the calibrating process based on the installation dates of the printers 2.

First, in S91, the computer 1 sets an environment in which to perform the calibrating process by using the environment ID in the calibration result data list shown in FIG. 18. In the example of FIG. 18, the computer 1 sets either the environment ID "A" or "B".

In S92, the computer 1 determines one printer that belongs to a group of the environment set in S91 by using, for example, an environment printer number in the printer list shown in FIG. 15. That is, the computer 1 is identifies one printer whose environment printer number is equal to environment printer number "a" for the environment set in S91. When the computer 1 performs the process of S92 for the first time, the computer 2, initializes the environment printer number "a" to "1". So, the computer 1 initially identifies a printer 2 that belongs to the group of the environment set in S91 and that has the environment printer number "a" (="1").

In S93, the computer 1 acquires the installation date "d" of the printer 2 identified in S92, by referring to the printer list shown in FIG. 15.

In S94, the computer 1 compares an installation date "t" that is temporarily stored in the computer 1 with the installation date "d" acquired in S93. The installation date "t" is initially set to such a date that is supposed to be earlier than a date when the calibration result data list updating process will be executed for the first time. For example, "Jan. 1, 1980" is set to the installation date "t" as the initial value.

In 595, the computer 1 determines whether the installation date "d" is later than the installation date "t". If the computer 1 determines that the installation date "d" is later than the installation date "t" (S95; YES), the process proceeds to S96. If the computer 1 determines that the installation date "d" is not later than the installation date "t" (S95: NO), the process jumps to S97.

In S96, the computer 1 sets the installation date "d" to the installation date "t". The computer 1 sets the environment printer number "a" to a variable "x."

In S97 the computer 1 determines whether the process of S92-S96 has been performed for all printers in the environment (group) set in S91. If the computer 1 determines that the process has been performed for all printers in the environment (S97: YES), the process proceeds to S98. At this time, the installation date "t" has been updated to the installation date latest among the installation dates of all the printers 2 belonging to the environment (group). If the computer 1 determines that the process has not been performed for all printers in the environment (S97: NO), the computer 1 returns to S92 to determine a printer which belongs to the environment set in S91 and whose environment printer number is equal to a result obtained by adding "1" to the current environment printer number "a."

In S98, the computer 1 transmits, to the printer whose environment printer number is "x", an instruction signal instructing to perform a calibrating process.

The process remains at S99 until the printer with the environmental printer number "x" finishes the calibrating process. If the computer 1 determines that the calibrating process has been completed (S99: YES), the process proceeds to S100. The computer 1 determines whether the calibrating process has been completed in accordance with whether the printer 2 has transmitted to the computer 1 a notification signal showing the completion of the calibrating process. It is noted that upon finishing the calibrating process, the printer 2 transmits the notification signal to the computer 1 and stores the density-correcting data (FIG. 10) in the printer-storing unit of the printer 2.

In S100, the computer 1 transmits a request signal requesting for the density-correcting data to the printer 2 that the computer 1 instructed to perform the calibrating process. On receiving this request signal, the printer 2 transmits, to the computer 1, the calibration result data stored in the printer-storing unit of the printer 2.

In S101, the computer 1 receives the calibration result data from the printer 2. In S102, the computer 1 updates the calibration result data list based on the calibration result data received from the printer 2.

In S103, the computer 1 determines whether the calibration result data list has been updated for all environments. If the computer 1 determines that the calibration result data list has been updated for all environments (S103: YES), the computer 1 ends the calibration result data list updating process. If the computer 1 determines that the calibration result data list has not yet been updated for all environments (S103: NO), the computer 1 returns to S91 to set an environment for which the calibration result data list should be updated next.

In the calibration result data list updating process of this modification, for each environment, the printer 2 whose installation date is the latest among all the printers in the environment is selected to perform a calibrating process. Hence, for each environment, a density-correcting data that is obtained by a printer that is supposed to be most unlikely influenced with changes across the ages can be used for all the printers in the group. This can reduce the total print density errors occurred by the printers belonging to the same group.

In the case shown in FIG. 22, in response to the request signal, the printer A transmits the density-correcting data after transmitting the notification signal, informing the computer 1 of the completion of calibrating process. However, the printer A may transmit the density-correcting data together with the notification signal. Alternatively, the printer A may transmit to the computer 1 the density-correcting data only, but not transmit the notification signal to the computer 1.

What is claimed is:

1. A calibration system comprising:

a plurality of printers each having condition generalized data, the condition generalized data being acquired by generalizing a plurality of sets of condition data, each condition data indicating at least one of temperature inside a corresponding printer and humidity inside the corresponding printer, the plurality of sets of condition data being detected a plurality of times within a prescribed time period;

a condition-data receiving unit that receives a plurality of sets of condition generalized data by receiving the condition generalized data from each of the plurality of printers;

a grouping unit that allocates, based on the plurality of sets of condition generalized data received from the plurality of printers by the condition-data receiving unit, each printer into one of a plurality of groups each corresponding to a range of the at least one of temperature and humidity, the grouping unit being configured to allocate a printer, whose at least one of temperature and humidity that is indicated by the set of condition generalized data falls within one range of the at least one of temperature and humidity, into corresponding one of the plurality of groups;

a printer-selecting unit that selects, for each group, a printer among printers belonging to the each group;

a correction data acquiring unit that acquires, for each group, one set of correction data created by the selected printer;

a group determining unit that determines one group, to which one of the printers that is desired to perform printing belongs; and a print-data creating unit that creates, based on the set of correction data created by the selected printer of the determined group, a set of print data which is to be used by the one of the printers that is desired to perform printing regardless of whether or not the one of the printers that is desired to perform printing is the selected printer of the determined group;

the calibration system further comprising a computer, wherein the condition-data receiving unit, the grouping unit, the printer-selecting unit, the correction data acquiring unit, the group determining unit and the print-data creating unit are provided in the computer, wherein each printer comprises:

a correction data creating unit that creates a set of correction data;

a storage unit that stores the set of correction data and the set of condition generalized data;

a condition-data transmitting unit that transmits the set of condition generalized data to the computer;

a print-data receiving unit that receives the set of print data from the computer; and a printing unit that performs printing operation based on the set of print data;

wherein the computer further comprises a print-instructing unit that transmits the set of print data to the one of the printers that is desired to perform printing;

wherein the storage unit of each printer further stores a set of toner-using-state data indicative of a state how toner has been used in the each printer, consumable version data indicative of version information of at least one of consumables in the each printer, and the set of condition generalized data;

wherein the condition-data receiving unit of the computer receives a plurality of sets of condition generalized data from the plurality of printers;

wherein the grouping unit of the computer allocates each printer into one of the plurality of groups, based on the set of condition generalized data transmitted from the each printer;

wherein the print-data creating unit of the computer acquires the set of toner-using-state data and the consumable version data from the printer desired to perform printing, and creates a set of print data based on the toner-using-state data and the consumable version data of the desired printer and the correction data corresponding to the determined group; and wherein the print-data creating unit of the computer further comprises:

an original print data acquiring unit that acquires a set of original print data indicating a density; and a correcting unit that acquires the set of toner-using-state data and the consumable version data from the printer desired to perform printing, and corrects the original print data into the print data based on the toner-using-state data and the consumable version data of the desired printer and the correction data corresponding to the determined group.

2. The calibration system according to claim 1, further comprising a correction data-storing unit that stores the set of correction data acquired for each group, the print-data creating unit creates a set of print data based on the set of correction data corresponding to the determined group read from the correction data-storing unit.

3. The calibration system according to claim 1, wherein the printer-selecting unit selects the printer by using a round-robin scheme.

4. The calibration system according to claim 1, wherein a set of installation data, representing time when the printer has been installed in a manner as being usable in the calibration system, being set for each printer, and wherein the printer-selecting unit selects, for each group, a printer whose set of installation data represents the time latest among the times represented by the sets of installation data set for all of the printers belonging to the group.

5. The calibration system according to claim 1, wherein a set of creation data representing time when the creating unit has created the set of correction data is set for each printer, and wherein the printer selecting unit selects, for each group, a printer whose set of creation data represents the time latest among the times represented by the sets of creation data set for all of the printers belonging to the group.

6. The calibration system according to claim 1, wherein each printer further comprises:

a test data preparing unit that prepares a set of test data;

a toner-use condition correcting unit that corrects the set of test data based on the toner-using-state data;

a mechanical factor correcting unit that corrects the set of test data based on the consumable version data;

a print controlling unit that controls the printing unit to print a test image based on the test data corrected by the toner-use condition correcting unit and the mechanical factor correcting unit; and a measuring unit that measures a density of the test image, wherein the correction data creating unit creates the set of correction data based on the measured density of the test image.

7. A computer connectable to a plurality of printers each having condition generalized data, the condition generalized data being acquired by generalizing a plurality of sets of condition data, each condition data indicating at least one of temperature inside a corresponding printer and humidity inside the corresponding printer, the plurality of sets of condition data being detected a plurality of times within a prescribed time period, the computer comprising:

a condition-data receiving unit that receives a plurality of sets of condition generalized data by receiving the condition generalized data from each of the plurality of printers;

a grouping unit that allocates, based on the plurality of sets of condition generalized data received from the plurality of printers by the condition-data receiving unit, each printer into one of a plurality of groups each corresponding to a range of the at least one of temperature and humidity, the grouping unit being configured to allocate a printer, whose at least one of temperature and humidity that is indicated by the set of condition generalized data falls within one range of the at least one of temperature and humidity, into corresponding one of the plurality of groups;

a printer-selecting unit that selects, for each group, a printer among printers belonging to the each group;

a correction data acquiring unit that acquires, for each group, one set of correction data created by the selected printer;

a group determining unit that determines one group, to which one of the printers that is desired to perform printing belongs; and a print-data creating unit that creates, based on the set of correction data created by the selected printer of the determined group, a set of print data which is to be used by the one of the printers that is desired to perform printing regardless of whether or not the one of the printers that is desired to perform printing is the selected printer of the determined group;

wherein each printer comprises:

a correction data creating unit that creates a set of correction data;

a storage unit that stores the set of correction data and the set of condition generalized data;

a condition-data transmitting unit that transmits the set of condition generalized data to the computer;

a print-data receiving unit that receives the set of print data from the computer; and a printing unit that performs printing operation based on the set of print data;

wherein the computer further comprises a print-instructing unit that transmits the set of print data to the one of the printers that is desired to perform printing;

wherein the storage unit of each printer further stores a set of toner-using-state data indicative of a state how toner has been used in the each printer, consumable version data indicative of version information of at least one of consumables in the each printer, and the set of condition generalized data;

wherein the condition-data receiving unit of the computer receives a plurality of sets of condition generalized data from the plurality of printers;

wherein the grouping unit of the computer allocates each printer into one of the plurality of groups, based on the set of condition generalized data transmitted from the each printer;

wherein the print-data creating unit of the computer acquires the set of toner-using-state data and the consumable version data from the printer desired to perform printing, and creates a set of print data based on the toner-using-state data and the consumable version data of the desired printer and the correction data corresponding to the determined group; and wherein the print-data creating unit of the computer further comprises:

an original print data acquiring unit that acquires a set of original print data indicating a density; and a correcting unit that acquires the set of toner-using-state data and the consumable version data from the printer desired to perform printing, and corrects the original print data into the print data based on the toner-using-state data and the consumable version data of the desired printer and the correction data corresponding to the determined group.

8. A method executed by a computer connectable to a plurality of printers, each having condition generalized data, the condition generalized data being acquired by generalizing a plurality of sets of condition data, each condition data indicating at least one of temperature inside a corresponding printer and humidity inside the corresponding printer, the plurality of sets of condition data being detected a plurality of times within a prescribed time period, the method comprising:

receiving by the computer a plurality of sets of condition generalized data by receiving the condition generalized data from each of the plurality of printers;

allocating by the computer, based on the plurality of sets of condition generalized data received from the plurality of printers, each printer into one of a plurality of groups each corresponding to a range of the at least one of temperature and humidity, and allocating a printer, whose at least one of temperature and humidity that is indicated by the set of condition generalized data falls within one range of the at least one of temperature and humidity, into corresponding one of the plurality of groups;

selecting by the computer, for each group, a printer among printers belonging to the each group;

acquiring by the computer, for each group, one set of correction data created by the selected printer;

determining by the computer one group, to which one of the printers that is desired to perform printing belongs;

creating by the computer, based on the set of correction data created by the selected printer of the determined group, a set of print data which is to be used by the one of the printers that is desired to perform printing regardless of whether or not the one of the printers that is desired to perform printing is the selected printer of the determined group;

creating by each printer a set of correction data;

storing by each printer the set of correction data and the set of condition generalized data;

transmitting by each printer the set of condition generalized data to the computer;

receiving by at least one printer the set of print data from the computer; and performing by the at least one printer the printing operation based on the set of print data;

wherein the method further comprises transmitting by the computer the set of print data to the one of the printers that is desired to perform printing;

wherein the method further comprises storing by each printer a set of toner-using-state data indicative of a state how toner has been used in the each printer, consumable version data indicative of version information of at least one of consumables in the each printer, and the set of condition generalized data;

wherein the method further comprises receiving by the computer a plurality of sets of condition generalized data from the plurality of printers;

wherein the method further comprises allocating by the computer each printer into one of the plurality of groups, based on the set of condition generalized data transmitted from the each printer;

wherein the method further comprises acquiring by the computer the set of toner-using-state data and the consumable version data from the printer desired to perform printing, and creating by the computer a set of print data based on the toner-using-state data and the consumable version data of the desired printer and the correction data corresponding to the determined group;

wherein the method further comprises acquiring by the computer a set of original print data indicating a density;

wherein the method further comprises acquiring by the computer the set of toner-using-state data and the consumable version data from the printer desired to perform printing; and wherein the method further comprises correcting by the computer the original print data into the print data based on the toner-using-state data and the consumable version data of the desired printer and the correction data corresponding to the determined group.

9. A non-transitory computer readable recording medium storing a set of program instructions executable on a computer connectable to a plurality of printers, each having condition generalized data, the condition generalized data being acquired by generalizing a plurality of sets of condition data, each condition data indicating at least one of temperature inside a corresponding printer and humidity inside the corresponding printer, the plurality of sets of condition data being detected a plurality of times within a prescribed time period the program instructions comprising:

receiving by the computer a plurality of sets of condition generalized data by receiving the condition generalized data from each of the plurality of printers;

allocating by the computer, based on the plurality of sets of condition generalized data received from the plurality of printers, each printer into one of a plurality of groups each corresponding to a range of the at least one of temperature and humidity and allocating a printer, whose at least one of temperature and humidity that is indicated by the set of condition generalized data falls within one range of the at least one of temperature and humidity, into corresponding one of the plurality of groups;

selecting by the computer, for each group, a printer among printers belonging to the each group;

acquiring by the computer, for each group, one set of correction data created by the selected printer;

determining by the computer one group, to which one of the printers that is desired to perform printing belongs; and creating by the computer, based on the set of correction data created by the selected printer of the determined group, a set of print data which is to be used by the one of the printers that is desired to perform printing regardless of whether or not the one of the printers that is desired to perform printing is the selected printer of the determined group;

creating by each printer a set of correction data;

storing by each printer the set of correction data and the set of condition generalized data;

transmitting by each printer the set of condition generalized data to the computer;

receiving by at least one printer the set of print data from the computer; and performing by the at least one printer the printing operation based on the set of print data;

wherein the program instructions further comprise transmitting by the computer the set of print data to the one of the printers that is desired to perform printing;

wherein the program instructions further comprise storing by each printer a set of toner-using-state data indicative of a state how toner has been used in the each printer, consumable version data indicative of version information of at least one of consumables in the each printer, and the set of condition generalized data;

wherein the program instructions further comprise receiving by the computer a plurality of sets of condition generalized data from the plurality of printers;

wherein the program instructions further comprise allocating by the computer each printer into one of the plurality of groups, based on the set of condition generalized data transmitted from the each printer;

wherein the program instructions further comprise acquiring by the computer the set of toner-using-state data and the consumable version data from the printer desired to perform printing, and creating by the computer a set of print data based on the toner-using-state data and the consumable version data of the desired printer and the correction data corresponding to the determined group;

wherein the program instructions further comprise acquiring by the computer a set of original print data indicating a density;

wherein the program instructions further comprise acquiring by the computer the set of toner-using-state data and the consumable version data from the printer desired to perform printing; and wherein the program instructions further comprise correcting by the computer the original print data into the print data based on the toner-using-state data and the consumable version data of the desired printer and the correction data corresponding to the determined group.

* * * * *